(12) United States Patent
Wright

(10) Patent No.: US 11,357,361 B1
(45) Date of Patent: Jun. 14, 2022

(54) MOBILE BATHROOM ASSEMBLY

(71) Applicant: Miami 20512 LLC, Davie, FL (US)

(72) Inventor: William Wright, Davie, FL (US)

(73) Assignee: MIAMI 20512 LLC, Davie, FL (US)

( * ) Notice: Subject to any disclaimer, the term of this patent is extended or adjusted under 35 U.S.C. 154(b) by 0 days.

(21) Appl. No.: 17/372,184

(22) Filed: Jul. 9, 2021

(51) Int. Cl.
A47K 4/00 (2006.01)
E04H 1/12 (2006.01)
B60R 15/04 (2006.01)
B60R 15/02 (2006.01)

(52) U.S. Cl.
CPC ............. A47K 4/00 (2013.01); E04H 1/1205 (2013.01); B60R 15/02 (2013.01); B60R 15/04 (2013.01)

(58) Field of Classification Search
CPC ................. A47K 4/00; B60P 3/34–341; B60R 15/00–04; E03C 1/044; E04B 1/34305–3431; E04H 1/1216
See application file for complete search history.

(56) References Cited

U.S. PATENT DOCUMENTS

| | | | |
|---|---|---|---|
| 689,164 A | 12/1901 | Castle | |
| 757,933 A | 4/1904 | Linendoll | |
| 1,514,157 A * | 11/1924 | Harding | B60R 15/04 296/156 |
| 2,567,506 A | 9/1951 | Bowman | |
| 2,944,852 A * | 7/1960 | Snyder | B60P 3/34 52/67 |
| 3,067,434 A | 12/1962 | Neal et al. | |
| 3,381,316 A | 5/1968 | Anderson | |
| 3,602,545 A | 8/1971 | Lindenbauer | |
| 3,646,618 A | 3/1972 | Johnson | |
| 4,261,613 A | 4/1981 | Alford | |
| 4,398,308 A * | 8/1983 | Berg | E03C 1/00 4/598 |
| 4,453,280 A | 6/1984 | Greenleaf | |
| 4,457,553 A | 7/1984 | Larkin | |
| 4,815,786 A * | 3/1989 | McRay | B60P 3/34 296/26.05 |
| 4,975,992 A | 12/1990 | Patterson et al. | |

(Continued)

FOREIGN PATENT DOCUMENTS

| | | | | |
|---|---|---|---|---|
| DE | 4017695 | * | 12/1991 | ............ E03C 1/044 |
| DE | 102004041834 | * | 3/2006 | ............... B60N 3/16 |

Primary Examiner — David P Angwin
Assistant Examiner — Nicholas A Ros
(74) Attorney, Agent, or Firm — Mark C. Johnson; Johnson Dalal

(57) ABSTRACT

A mobile bathroom assembly with a support frame member assembly operably configured to attach to a trailer hitch and support a lower shell and an upper shell. The lower shell includes a bottom wall and a sidewall enclosing a lower shell cavity and having a lower sidewall door. The bottom wall includes a toilet assembly coupled thereto fluidly coupled to a liquid supply tank and a circulation pump operably configured to induce a flow of liquid from the liquid supply tank to the toilet assembly. The upper shell also includes a sidewall surrounding a ceiling wall and defining an upper shell cavity, wherein the upper shell is operably configured with a motor assembly to extend upwards and contract downwards with respect to the lower shell to increase and decrease the internal assembly height and lower and upper shell cavities within the lower and upper shells.

18 Claims, 21 Drawing Sheets

(56) References Cited

U.S. PATENT DOCUMENTS

| | | | |
|---|---|---|---|
| 4,979,242 A | | 12/1990 | Maggio |
| 5,111,538 A | | 5/1992 | Chapman |
| 5,379,466 A | * | 1/1995 | Davies .................. A47K 3/325 |
| | | | 4/449 |
| 6,000,074 A | | 12/1999 | Glover |
| 6,179,368 B1 | * | 1/2001 | Karlsson ................ E04H 15/06 |
| | | | 135/88.13 |
| 6,802,327 B2 | | 10/2004 | Koss |
| 7,758,103 B1 | * | 7/2010 | Steury ...................... B60P 3/34 |
| | | | 296/26.05 |
| 8,104,112 B2 | | 1/2012 | Tsai et al. |
| 8,225,436 B1 | | 7/2012 | Cotton |
| 8,678,472 B2 | * | 3/2014 | Pierce .................... B60P 3/341 |
| | | | 296/159 |
| 9,199,701 B2 | * | 12/2015 | Sahr ....................... B63B 29/14 |
| 10,183,608 B2 | * | 1/2019 | Knight ..................... B60P 3/34 |
| 10,654,426 B1 | * | 5/2020 | Keller ...................... E03D 3/10 |
| 10,863,870 B2 | | 12/2020 | Hart |
| 2010/0269875 A1 | | 10/2010 | Notermann |
| 2011/0094027 A1 | | 4/2011 | Barney et al. |
| 2011/0113545 A1 | * | 5/2011 | Driessen ................ B60R 15/00 |
| | | | 4/476 |
| 2012/0000015 A1 | * | 1/2012 | McClendon .......... E04H 1/1216 |
| | | | 4/476 |
| 2012/0167297 A1 | * | 7/2012 | Poust ................... E04H 1/1205 |
| | | | 4/321 |
| 2017/0335561 A1 | | 11/2017 | Wickramasekera |

\* cited by examiner

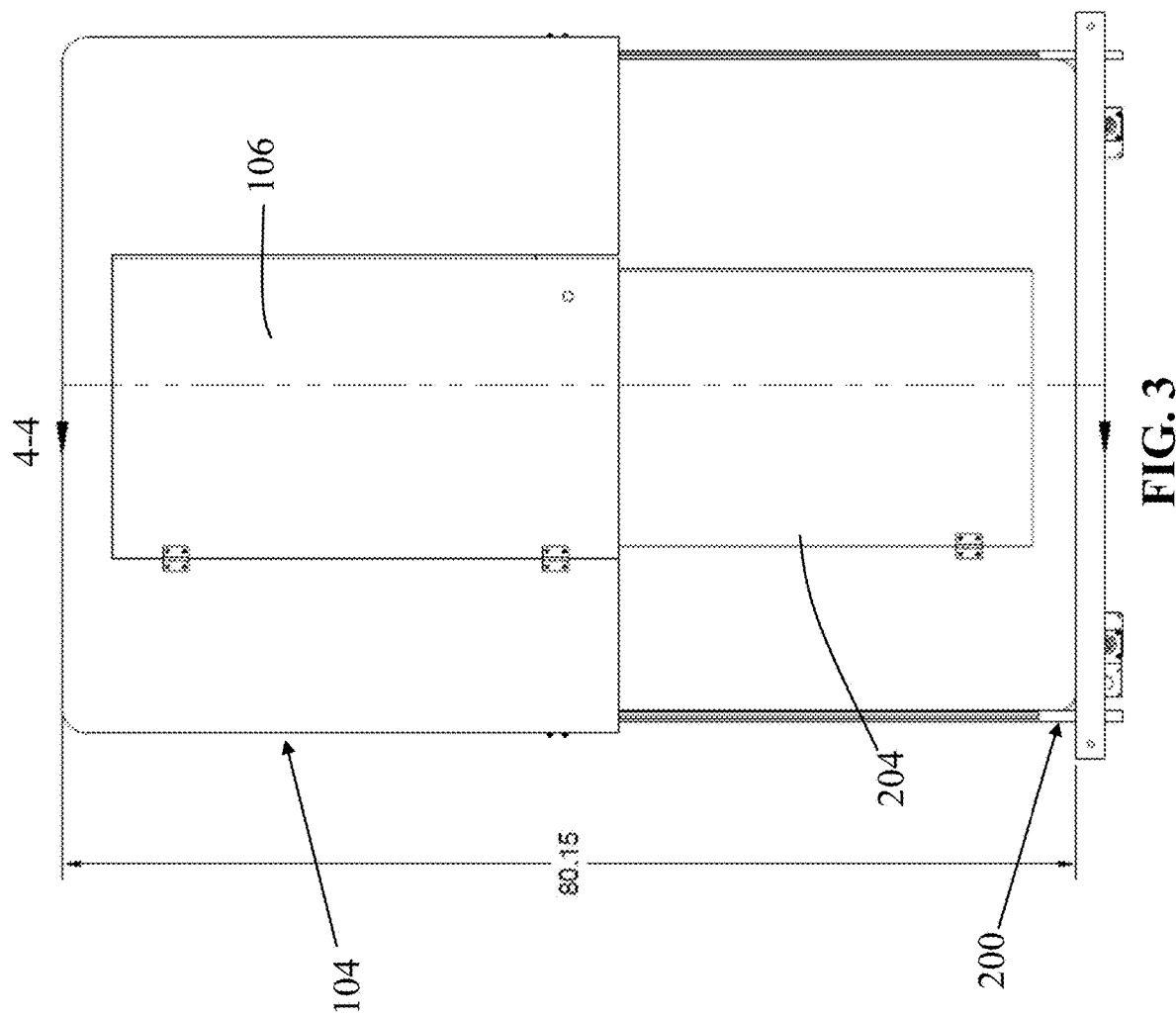

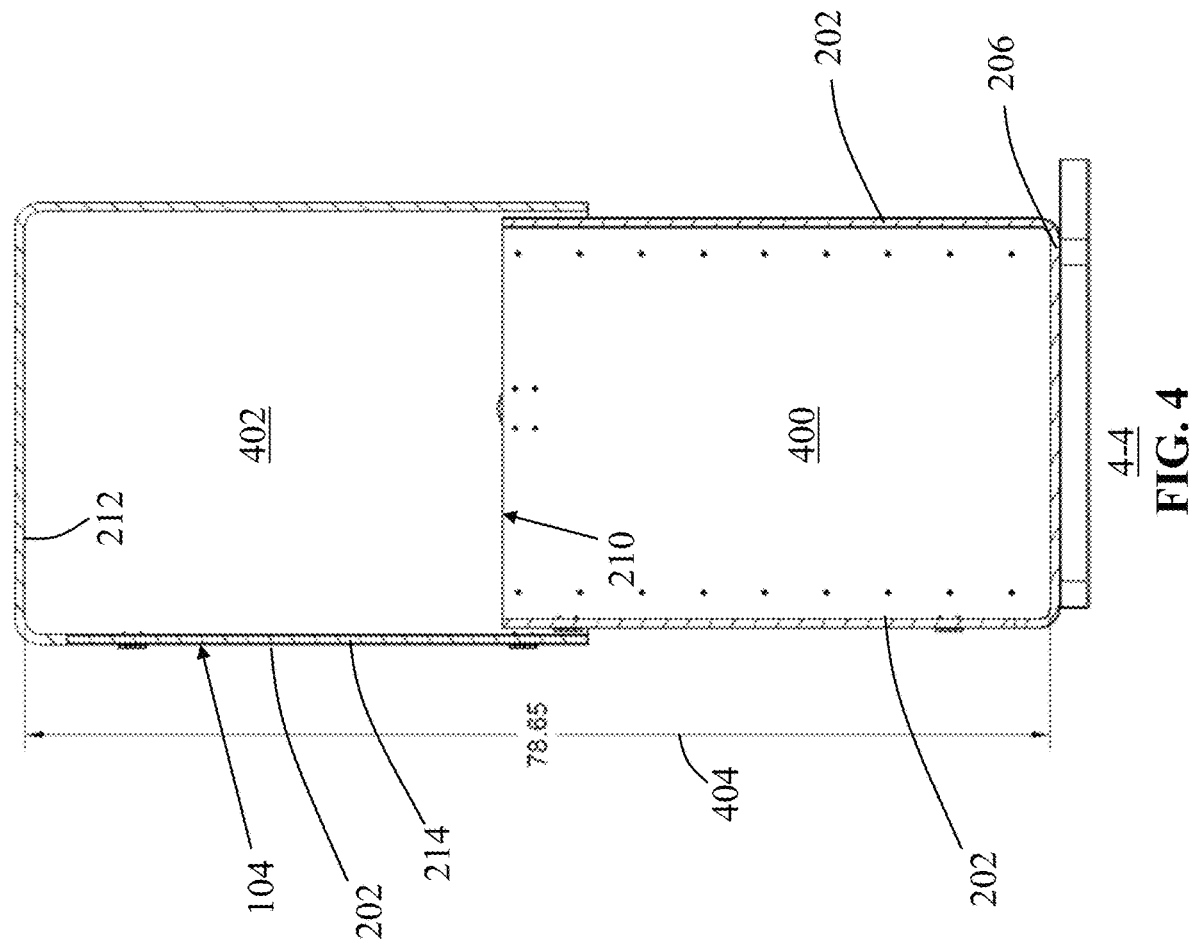

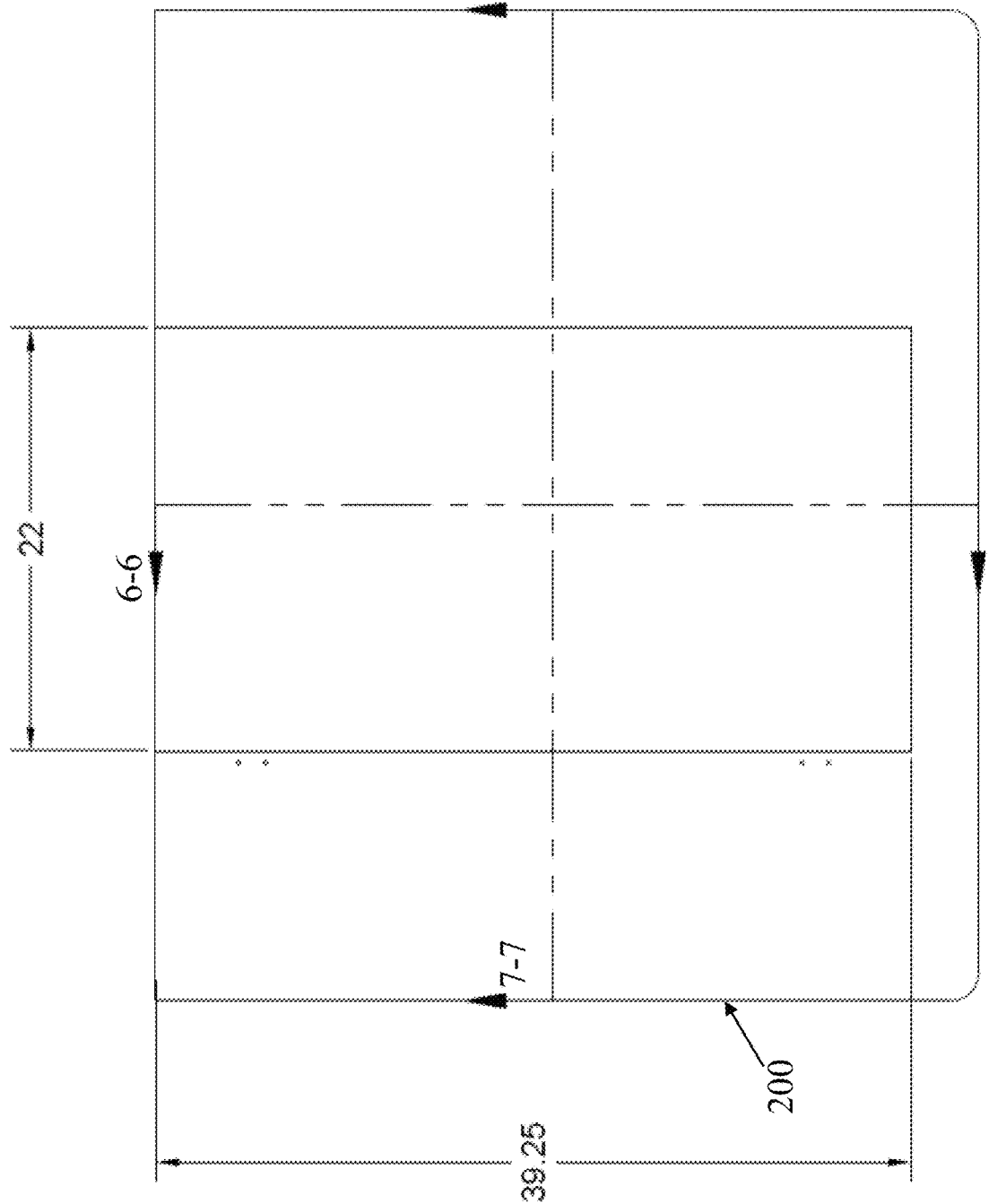

7-7

6-6

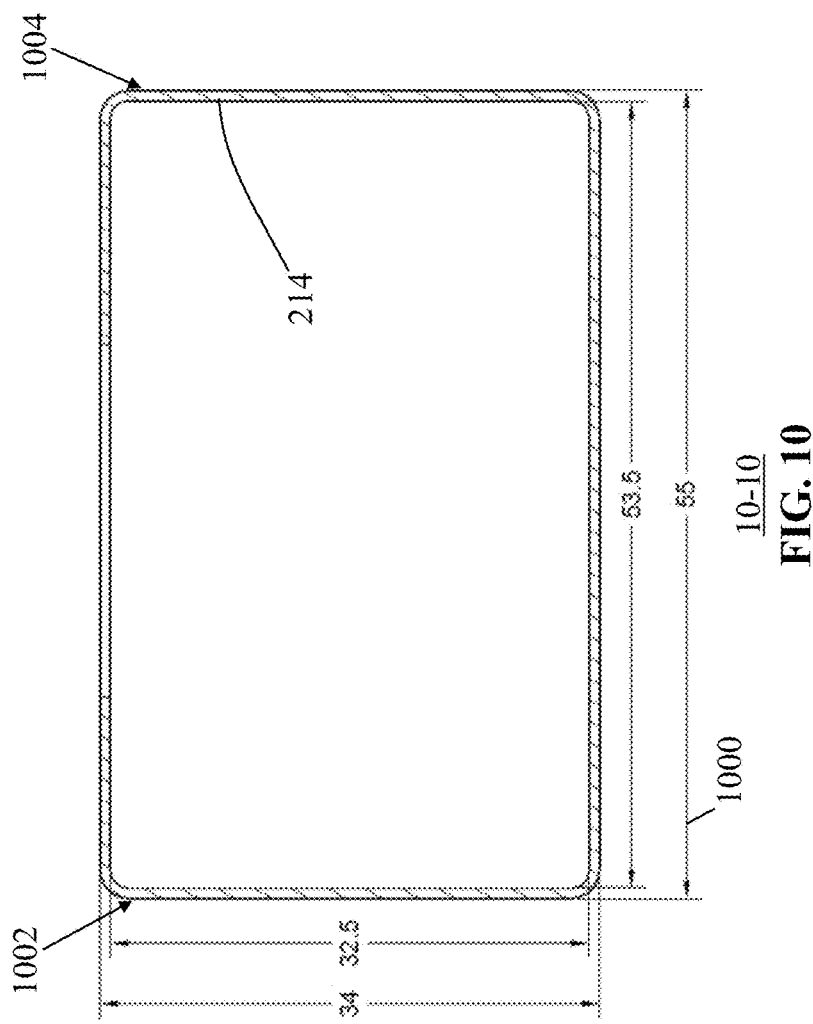
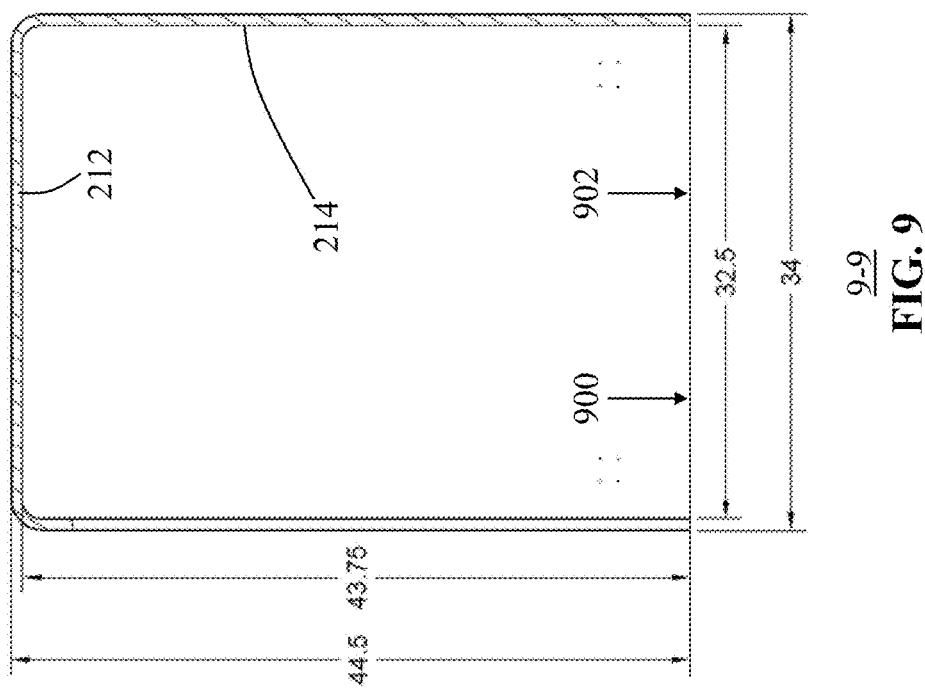

A-A

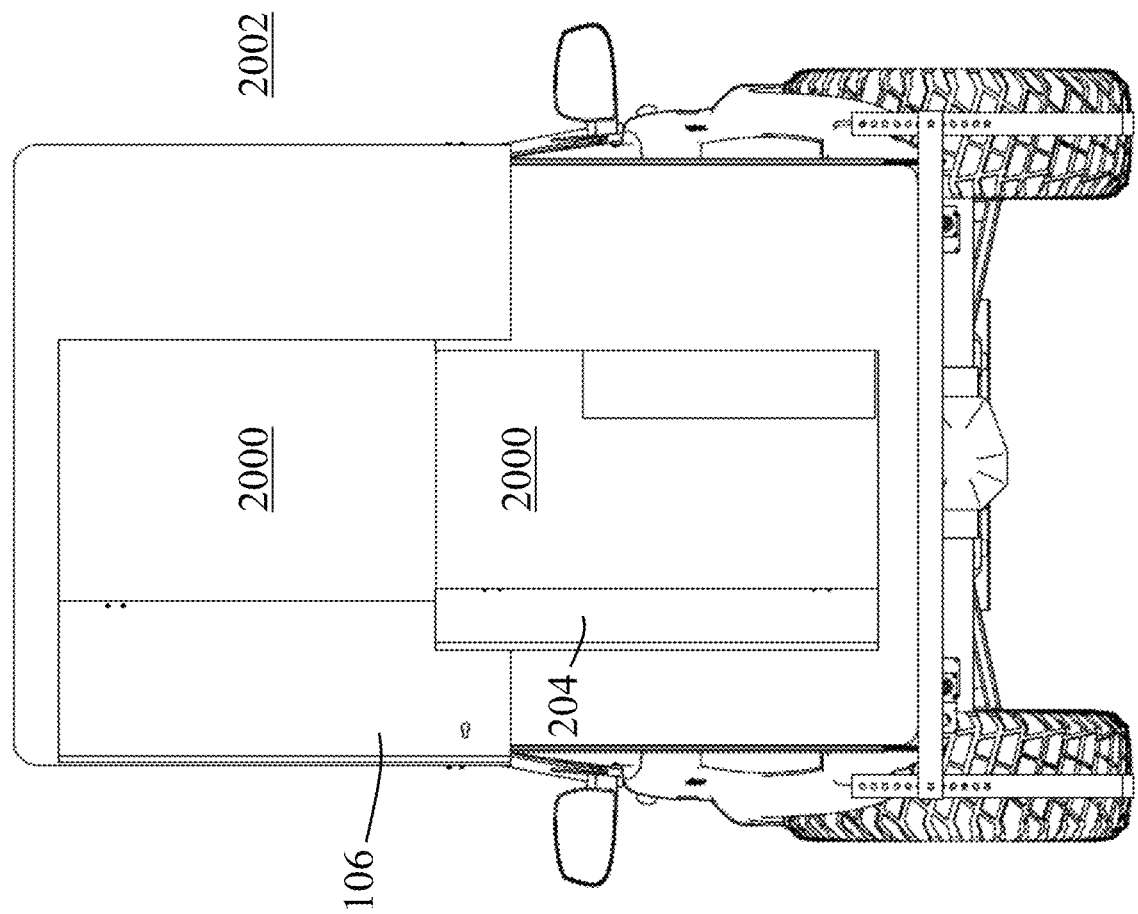

MOBILE BATHROOM ASSEMBLY

FIELD OF THE INVENTION

The present invention relates generally to mobile bathrooms and, more particularly, relates to mobile bathrooms operably configured to be transported with a vehicle.

BACKGROUND OF THE INVENTION

Many users travel long distances with their vehicles and/or leave their vehicles for long periods of time. As such, many users need to use, or desire to use, a bathroom for their personal needs and/or for cleanliness. A portable bathroom or toilet is typically not connected to any hole in the ground (like a pit latrine), nor is it typically connected to a septic tank or plumbed into a municipal system leading to a sewage treatment plant. A mobile bathroom, by definition, is operable to be picked up, moved, and transported. Some portable toilets can be carried by one person, as in the main image, whereas others need heavy lifting equipment such as a truck and crane.

Specifically, some known mobile bathrooms require expensive and cumbersome equipment to move and/or transport the bathroom assembly from place to place. Many known mobile bathrooms also do not enable the user to transport the bathroom assembly utilizing a vehicle. The known mobile bathrooms that are transportable with a vehicle after often oversized, making it difficult and/or unsafe to transport the bathroom assembly. Many of these known mobile bathrooms are also not enabled to permit users to take showers, wash their hands, and use the bathroom, in an effective and efficient manner.

Therefore, a need exists to overcome the problems with the prior art as discussed above.

SUMMARY OF THE INVENTION

The invention provides a mobile bathroom assembly that overcomes the hereinafore-mentioned disadvantages of the heretofore-known devices and methods of this general type and that effectively, efficiently, and safely enables users to transport the bathroom assembly in a compact configuration and expand said bathroom assembly for completely utilization by a user.

With the foregoing and other objects in view, there is provided, in accordance with the invention, a mobile bathroom assembly having a support frame member assembly with a rigid hitch frame member operably configured to be insertably lockably retained, with a hitch fastener, to a trailer hitch coupled to a vehicle and at least one rigid support frame member coupled to the rigid hitch frame member. Additionally, the assembly includes a lower shell directly coupled to the at least one rigid support frame member having a bottom wall, and having a sidewall surrounding the bottom wall, enclosing a lower shell cavity, with an upper end opposing the bottom wall and defining a lower shell opening, and with a lower sidewall door hingedly coupled thereto, wherein the bottom wall has a toilet assembly coupled thereto, a sink assembly coupled thereto and with a faucet and sink bowl, and a floor drain directly coupled thereto. The toilet assembly and faucet are fluidly coupled to a liquid supply tank and a circulation pump electrically coupled to a power source and operably configured to induce a flow of liquid from the liquid supply tank to the toilet assembly and the faucet. The assembly also includes an upper shell having a ceiling wall, defining an internal assembly height spanning from the ceiling wall to the bottom wall and having a sidewall slidably coupled to the sidewall of the lower shell in a retained configuration, surrounding the ceiling wall, enclosing an upper shell cavity overlapping the lower shell opening, with a lower end opposing the ceiling wall and defining an upper shell opening with the sidewall of the lower shell disposed therein, and with an upper sidewall door hingedly coupled thereto and disposed in an overlapping configuration with the lower sidewall door. The upper shell has a shower head coupled thereto, disposed within the upper shell cavity, and fluidly coupled to the liquid supply tank and the circulation pump operably configured to induce a flow of liquid from the liquid supply tank to the shower head. Additionally, the motor assembly is coupled to the lower shell, is electrically coupled to the power source, and is operably configured to selectively cause the upper shell to translate linearly along an upper shell translation path with respect to the upper shell to modulate the internal assembly height.

In accordance with another feature, an embodiment of the present invention includes a first tongue-and-groove configuration track assembly coupled to the sidewalls of the lower and upper shells on a left side of the lower shell and a second tongue-and-groove configuration track assembly coupled to the sidewalls of the lower and upper shells on a right side of the lower shell opposing the left side of the lower shell.

In accordance with yet another feature, an embodiment of the present invention also includes the motor assembly having a first motor operably coupled to a driving sprocket directly coupled to a chain directly coupled to an idler sprocket coupled to the left side of the lower shell and directly coupled to a guiding sprocket coupled to the sidewall of the upper shell with at least one guiding sprocket fastener and a second motor operably coupled to a driving sprocket directly coupled to a chain directly coupled to an idler sprocket coupled to the right side of the lower shell and directly coupled to a guiding sprocket coupled to the sidewall of the upper shell with at least one guiding sprocket fastener.

In accordance with a further feature of the present invention, the idler sprockets coupled to the left and right sides of the lower shell are disposed proximal to the upper end of the lower shell.

In accordance with a further feature, an embodiment of the present invention also includes the support frame member assembly with a plurality of tubular rigid support frame members including a left rigid support frame member, a middle rigid support frame member, and a right rigid support frame member each spatially offset from one another and coupled together with a proximal rigid support frame member and a distal rigid support frame member, wherein at least two of the left, middle, right, proximal, and distal rigid support frame members have a plurality of support surfaces defining a support plane parallel with a hitch plane defined by the upper surface of the rigid hitch frame member.

In accordance with an exemplary feature, an embodiment of the present invention also includes a plurality of wheels operably coupled to at least two of the left, middle, right, proximal, and distal rigid support frame members and coupled to the lower shell, wherein the lower shell operably configured to translate linearly along a shell translation path and along the support plane.

In accordance with an additional feature, an embodiment of the present invention also includes the lower shell operably configured to be placed in a linearly locked positional configuration along the shell translation path with a plurality of locking fasteners.

In accordance with another feature, an embodiment of the present invention also includes a distal rigid support frame member on the support frame member assembly and defining at least one outrigger aperture defined thereon. Additionally, at least one outrigger member is sized and shaped to be received within the at least one outrigger aperture, wherein the least one outrigger member operably configured to slidably lockably couple to the distal rigid support frame member with an outrigger locking fastener and operably configured to translate in an outrigger translation path perpendicular to a support plane defined by a plurality of support surfaces on the support frame member assembly.

In accordance with an exemplary feature, an embodiment of the present invention also includes the support frame member assembly with a plurality of tubular rigid support frame members including a left rigid support frame member, a middle rigid support frame member, and a right rigid support frame member each spatially offset from one another and coupled together with a proximal rigid support frame member and the distal rigid support frame member, wherein at least two of the left, middle, right, proximal, and distal rigid support frame members having the plurality of support surfaces defining the support plane parallel with a hitch plane defined by the upper surface of the rigid hitch frame member.

In accordance with an additional feature, an embodiment of the present invention also includes a first outrigger aperture and a second outrigger aperture both defined on the distal rigid support frame member and defining an outrigger spacing length separating a first outrigger member and a second outrigger member sized and shaped to be received within the first and second outrigger apertures, respectively. Additionally, an outer shell width separating two outer opposing surface sides of the upper shell and flanking the upper sidewall door, the outer shell width less than the outrigger spacing length.

In accordance with a further feature of the present invention, the motor assembly is operably configured to selectively cause the upper shell to translate linearly along the upper shell translation path with respect to the lower shell to generate a contracted transportation configuration and an expanded utilization configuration, the contracted transportation configuration including the ceiling wall disposed proximal to the upper end of the lower shell and the utilization configuration including the internal assembly height at least 1.5 times greater than a lower shell height separating the inner surface of the bottom wall of the lower shell.

In accordance with yet another feature of the present invention, the contracted transportation configuration and the utilization configuration both include the lower sidewall door and the upper sidewall door operably configured to open to define an assembly access opening exposing an ambient environment to the lower shell opening and upper shell cavity, the assembly access opening spanning at least 90% of the internal assembly height.

In accordance with a further feature of the present invention also includes a heat exchanger electrically coupled to a power source and fluidly coupled to the liquid supply tank downstream therefrom and fluidly coupled to the shower head and the faucet upstream therefrom, wherein the heat exchanger operably configured to selectively transfer heat to a liquid housed within the liquid supply tank.

Also in accordance with the present invention and in combination with a vehicle having a trailer hitch with a receiver tube, an improvement is disclosed that includes a mobile bathroom assembly with a support frame member assembly having a rigid hitch frame member disposed within the receiver tube of the trailer hitch in a lockably retained configuration with a hitch fastener, wherein the support frame member assembly has at least one rigid support frame member coupled to the rigid hitch frame member. Additionally, a lower shell is directly coupled to the at least one rigid support frame member, has a bottom wall, and has a sidewall surrounding the bottom wall, encloses a lower shell cavity, with an upper end opposing the bottom wall and defining a lower shell opening, and with a lower sidewall door hingedly coupled thereto, wherein the bottom wall has a toilet assembly coupled thereto and is fluidly coupled to a liquid supply tank and a circulation pump electrically coupled to a power source and operably configured to induce a flow of liquid from the liquid supply tank to the toilet assembly. Additionally, the improvement includes an upper shell having a ceiling wall, defining an internal assembly height spanning from the ceiling wall to the bottom wall and having a sidewall slidably coupled to the sidewall of the lower shell in a retained configuration, surrounding the ceiling wall, enclosing an upper shell cavity overlapping the lower shell opening, with a lower end opposing the ceiling wall and defining an upper shell opening with the sidewall of the lower shell disposed therein, and with an upper sidewall door hingedly coupled thereto and disposed in an overlapping configuration with the lower sidewall door. Further, the improvement includes a motor assembly coupled to the lower shell, electrically coupled to the power source, and operably configured to selectively cause the upper shell to translate linearly along an upper shell translation path with respect to the upper shell to modulate the internal assembly height.

In accordance with a further feature, an embodiment of the present invention also includes a sink assembly coupled to the bottom wall and with a faucet and sink bowl and a floor drain directly coupled to the bottom wall, the faucet fluidly coupled to the liquid supply tank and the circulation pump, wherein the power source operably configured to induce a flow of liquid from the liquid supply tank to the faucet.

Although the invention is illustrated and described herein as embodied in a mobile bathroom assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the assembly, spanning from a bottom wall to a ceiling wall. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 3 is an elevational front view of a mobile bathroom assembly in a utilization configuration in accordance with one embodiment of the present invention;

FIG. 4 is a cross-sectional view of the mobile bathroom assembly along section line 4-4 in FIG. 2;

FIG. 5 is an elevational front view of a lower shell of the mobile bathroom assembly in accordance with one embodiment of the present invention;

FIG. 9 is a cross-sectional view of the upper shell along section line 9-9 in FIG. 8;

FIG. 10 is a cross-sectional view of the upper shell along section line 10-10 in FIG. 8;

FIG. 19b is a close-up view of area A-A in FIG. 19a;

FIG. 20 is an elevational front view of a mobile bathroom assembly in a utilization configuration and coupled to a vehicle in accordance with one embodiment of the present invention;

DETAILED DESCRIPTION

Figure 1:
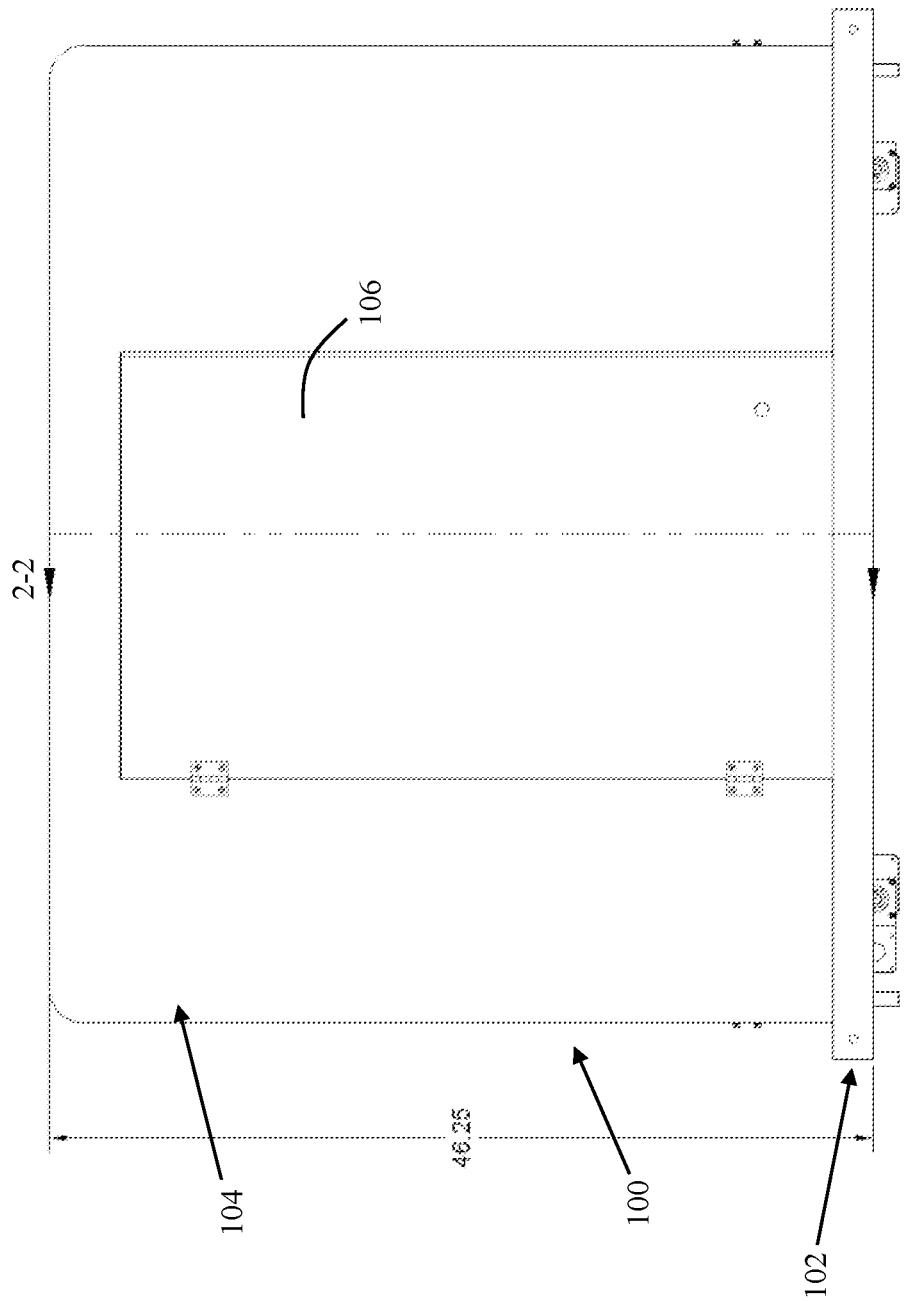
FIG. 1 is an elevational front view of a mobile bathroom assembly in a contracted transportation configuration in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient mobile bathroom assembly 100 that is operably configured to couple to a trail hitch on a vehicle (e.g., truck, SUV, RV, etc.) and expand and contract in height for comfortable, effective, and safe use and transport of the bathroom assembly.

Figure 2:
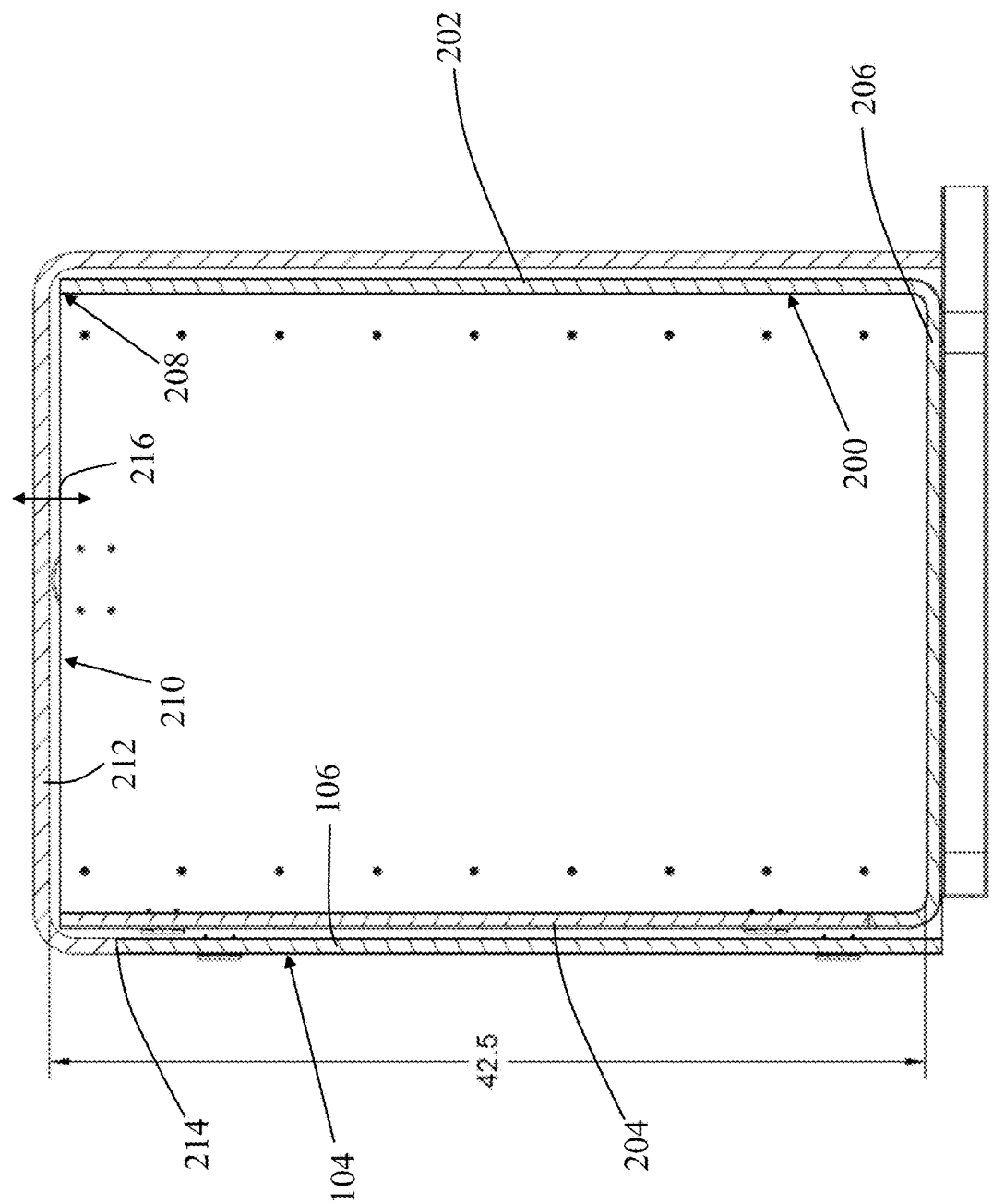
FIG. 2 is a cross-sectional view of the mobile bathroom assembly along section line 2-2 in FIG. 1.
Figure 7:
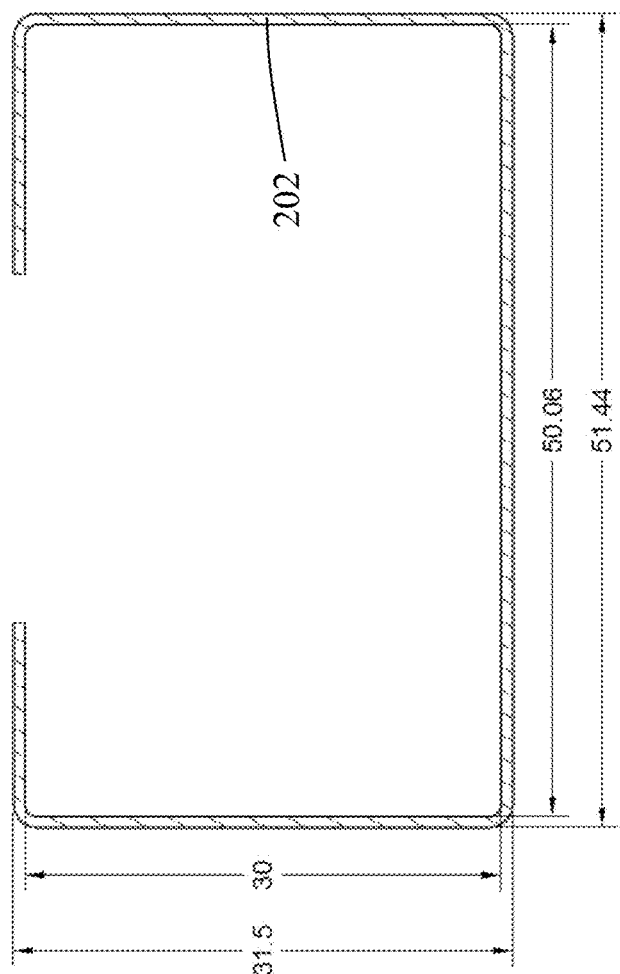
FIG. 7 is a cross-sectional view of the lower shell along section line 7-7 in FIG. 5.
Figure 6:
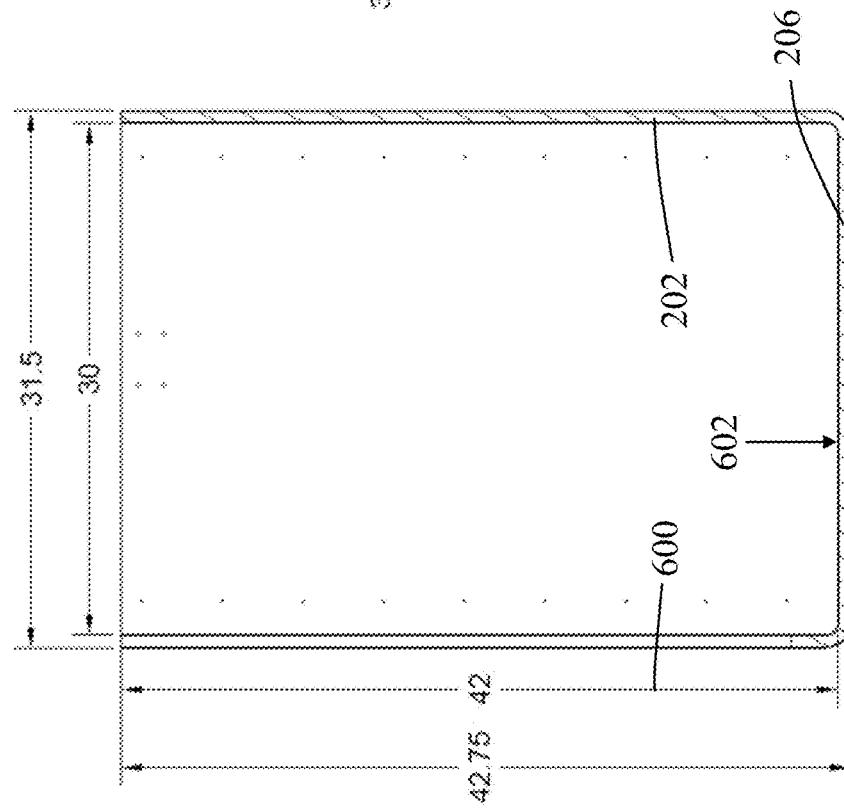
FIG. 6 is a cross-sectional view of the lower shell along section line 6-6 in FIG. 5.
Figure 8:
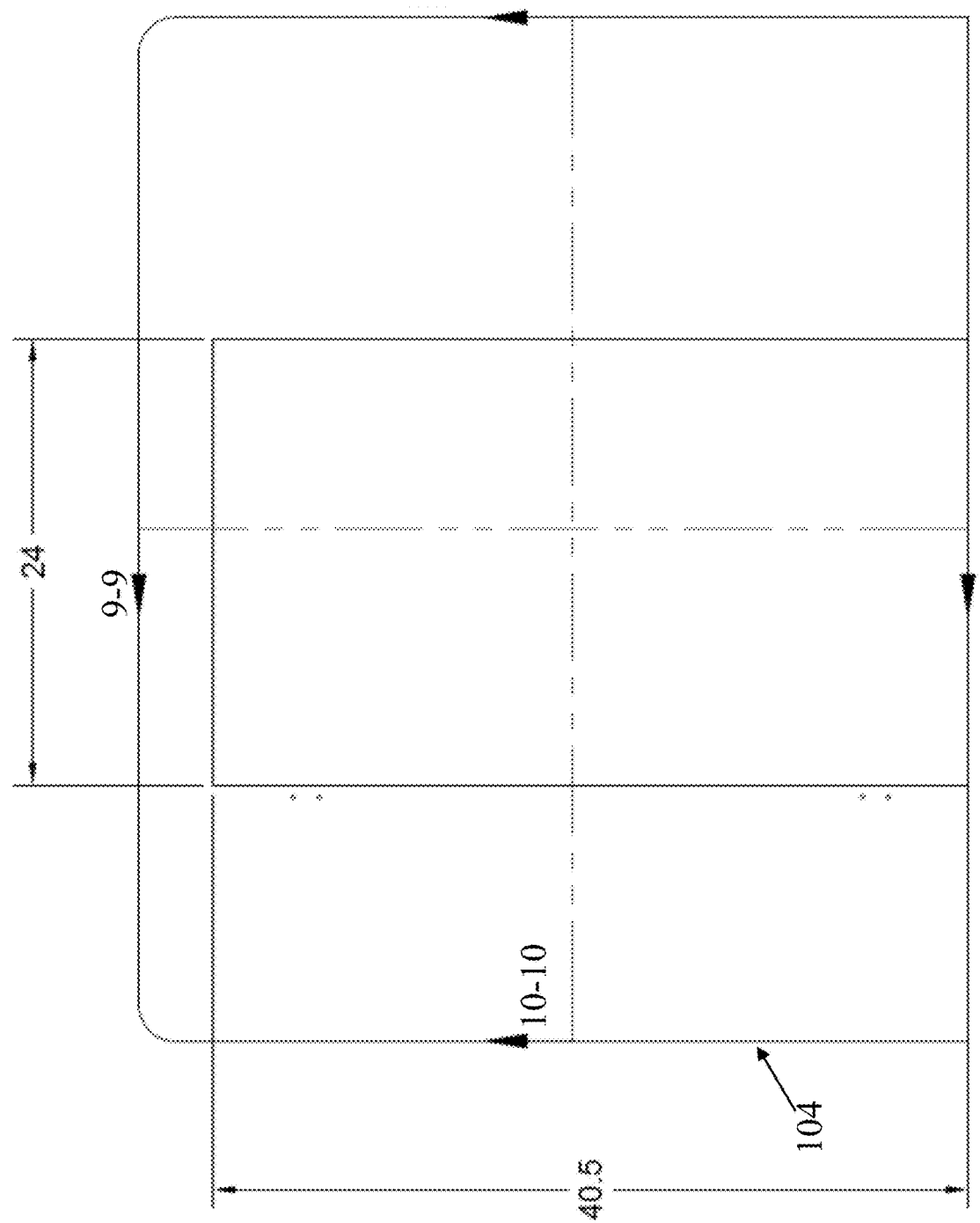
FIG. 8 is an elevational front view of an upper shell of the mobile bathroom assembly in accordance with one embodiment of the present invention.
Figure 11:
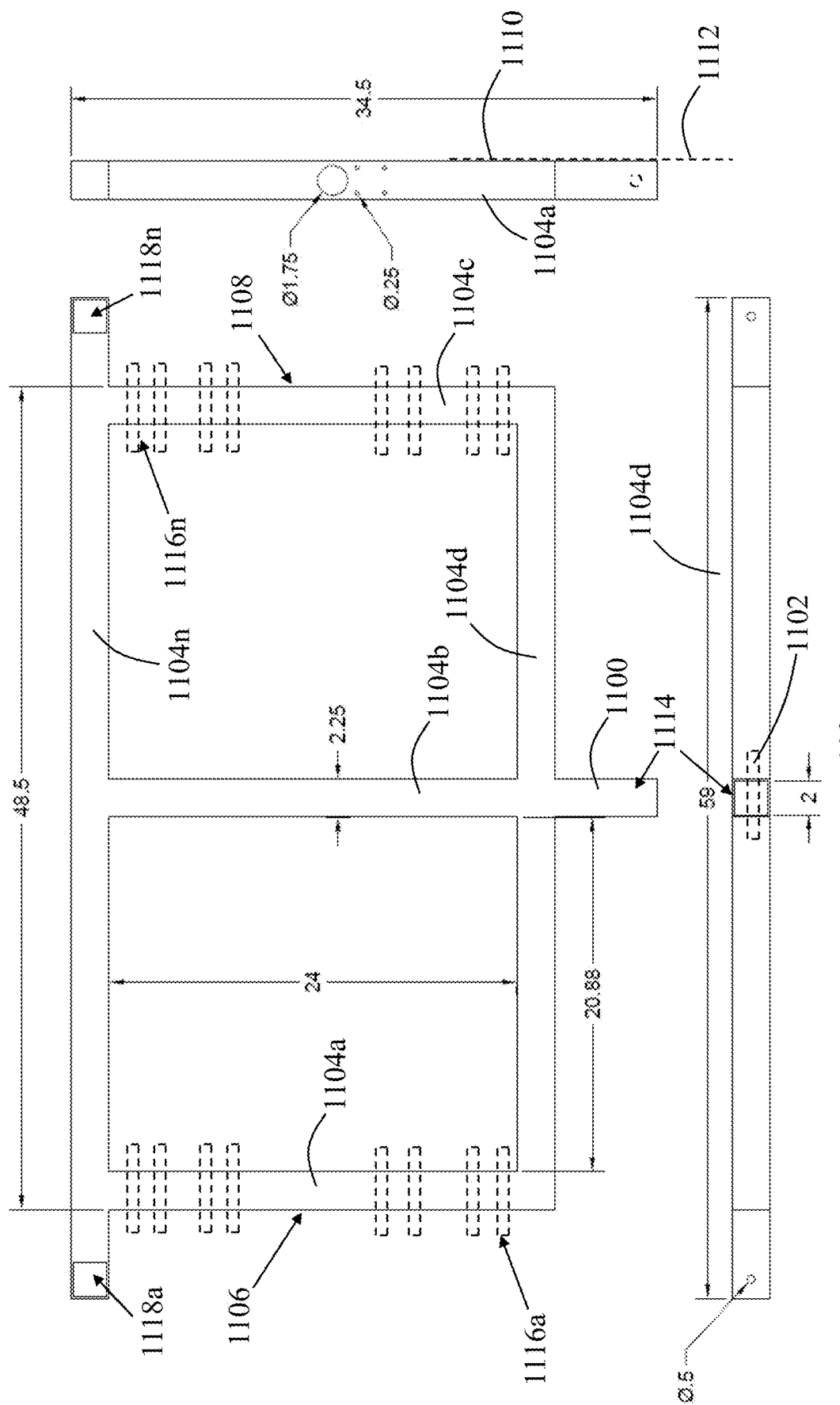
FIG. 11 is a top plan view, elevational side view, and elevational front view of a support frame member assembly of the mobile bathroom assembly in accordance with one embodiment of the present invention.
Figure 13:
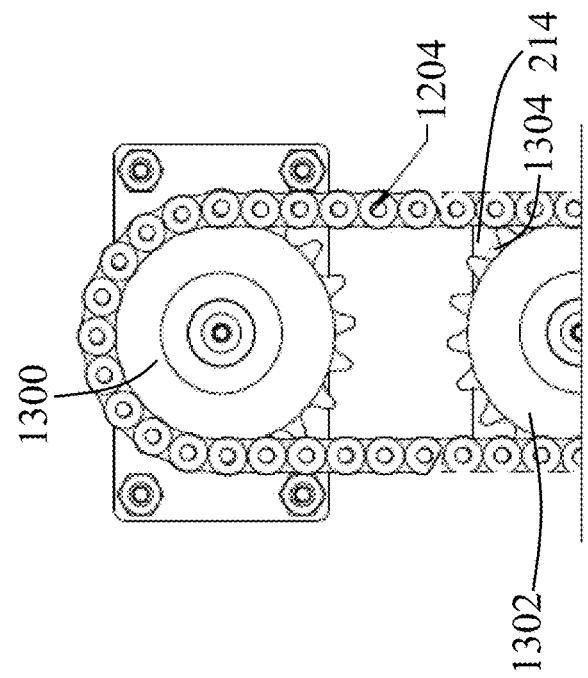
FIG. 13 is an elevational front view of an idler sprocket and a guiding sprocket utilized with the motor assembly of the mobile bathroom assembly in accordance with one embodiment of the present invention.

Referring now to FIG. 1, one embodiment of the present invention is shown in an elevational front view. That said, FIG. 1, along with the other figures herein, show several advantageous features of the present invention, but, as will be described below, the invention can be provided in several shapes, sizes, combinations of features and components, and varying numbers and functions of the components. The first example of a mobile bathroom assembly 100, as shown in FIGS. 1-2 and FIG. 11, includes a support frame member assembly 102, a lower shell 200, and an upper shell 104 that is selectively translatable with respect to the lower shell 200 using, for example, a motor assembly 1200 (depicted best in FIG. 12). Said another way, the upper shell 104 is translatably coupled to the lower shell 200 such that the internal height within the upper and lower shells 104, 200 can be selectively increased and decreased based on the utilization (or lack thereof) of the assembly 100.

The support frame member assembly 102 may include a rigid hitch frame member 1100 operably configured to be insertably lockably retained, with a hitch fastener 1102 (e.g., dowel pin), to a trailer hitch 1600 coupled to the vehicle 1602. The support frame member assembly 102 may include one or more rigid support frame member(s) 1104a-n coupled to the rigid hitch frame member 1100, wherein the "n" is any number greater than one. The rigid hitch frame member 1100 (along with the other frame members discussed herein) may be of a waterproof or water-resistant rigid material such, as tubular stainless steel, aluminum, or another substantially rigid material capable of supporting (without plastic deformation or failure) the weight of the upper and lower shells 104, 200, the components therein, and at least one individual user weighing at least 250-300 lbs, i.e., a total weight of approximately 400-500 lbs.

In one embodiment, the support frame member assembly 102 includes a plurality of tubular rigid support frame members 1104a-n that includes a left rigid support frame member 1104a, a middle rigid support frame member 1104b, and a right rigid support frame member 1104c each spatially offset from one another and coupled together with a proximal rigid support frame member 1104d and the distal rigid support frame member 1104n. This beneficial configuration enables the coupling and movement of the shells 104, 200 discussed herein and also minimizes the weight of the support frame member assembly 102. Further, at least two of either the left, middle, right, proximal, and distal rigid support frame members 1104a-n have a plurality of support surfaces defining a support plane 1110 parallel with a hitch plane 1112 defined by the upper surface 1114 of the rigid hitch frame member 1100. Said another way, the plurality of support surfaces enables the lower shell 200 to be placed and transported in a level or parallel orientation with respect to the vehicle and/or the ground surface.

With reference to FIG. 2, FIG. 4, FIG. 14, FIG. 16, FIGS. 19a-b, and FIGS. 25-26, the lower shell 200 is directly coupled to the one or more rigid support frame member(s) 1104a-n using one or more fastener(s) and/or welding. In one embodiment, the lower shell 200 is coupled to the one or more rigid support frame member(s) 1104a-n with a plurality of wheels 1604a-b, 1900. Said another way, the plurality of wheels 1604a-b, 1900 are operably coupled to at least two of either the left, middle, right, proximal, and distal rigid support frame members 1104a-n and coupled to the lower shell 200, whereby the lower shell 200 is operably configured to translate linearly along a shell translation path (represented with arrow 1606) and along the support plane 1110. In another embodiment, the plurality of wheels 1604a-b, 1900 are placed in a retained configuration with the plurality of wheels 1604a-b, 1900 located on the top, sides, or bottom of the support frame members 1104a-b instead of within the support frame members 1104a-b. Specifically, as seen best in FIGS. 19a-b, the support frame members 1104a-b may have a recessed tongue-and-groove channel accessible from the ends of the support frame members 1104a-b or along the length of the support frame members 1104a-b, whereby the plurality of wheels 1604a-b, 1900 are only operable to linearly translate within the support frame members 1104a-b and prevented from moving laterally outside of the frame member retaining said wheel.

As such, the lower shell 200 is operably configured to be placed in a linearly locked positional configuration along the shell translation path 1606 with a plurality of locking fasteners 1116a-n. Said another way, the lower shell 200 (and upper shell 104) are able to be moved and locked in various positions along the support frame members 1104a-b. This is particularly beneficial because it enables the lower shell 200 (and upper shell 104) to move away from the rear hatch or tailgate of the vehicle, thereby enabling conventional use and access thereto. In one embodiment, the linearly locked positional configuration will be proximal (i.e., at or near, within 10% of the referencing length) to the distal rigid support frame member 1104n (thereby proving the maximum amount of distance away from the rear hatch or tailgate of the vehicle). Another linearly locked positional configuration will be proximal to the rigid hitch frame member 1100, thereby reducing air drag experienced on the lower shell 200 (and upper shell 104) when in transport.

The lower shell 200 includes a bottom wall 206 and a sidewall 202 surrounding the bottom wall 206, enclosing a lower shell cavity 400, with an upper end 208 opposing the bottom wall 206 and defining a lower shell opening 210, and with a lower sidewall door 204 hingedly coupled thereto. As used herein, the term "wall" is intended broadly to encompass continuous structures, as well as, separate structures that are coupled together so as to form a substantially continuous external surface. The lower sidewall door 204 may be rotatably coupled to the sidewall 202 with one or more hinges and provides selective access to the lower shell opening 210. The bottom wall 206 beneficially includes a toilet assembly 1900 coupled thereto with one or more fasteners, welding, etc. The bottom wall 206 may also include a sink assembly 1400 coupled thereto and having a faucet 1402 and sink bowl 1500 for the emitted liquid from the faucet to pool and/or drain through sink drain. The bottom wall 206 may also beneficially include a floor drain 1904 directly coupled thereto and operably configured to cause draining of any pooled liquid on the bottom wall 206 to a liquid supply tank 2600 and/or a waste storage tank 2602. The liquid supply tank 2600 and/or the waste storage tank 2602 may be located below the bottom wall 206, within a housing of the sink assembly 1400, and/or on the support frame member assembly 102, and may be coupled thereto using one or more fasteners, adhesive, etc. In some embodiments, the assembly 100 may be mechanically and fluidly coupled to an external water supply source (that may be pressurized) and/or an external heater. Additionally, the assembly 100 may utilize a water drain tank, an auxiliary tank, or discharge hose that would discharge waste from the system when recirculating water. If using an RV-style toilet discharge, however, a water supply would be needed.

Figure 25:
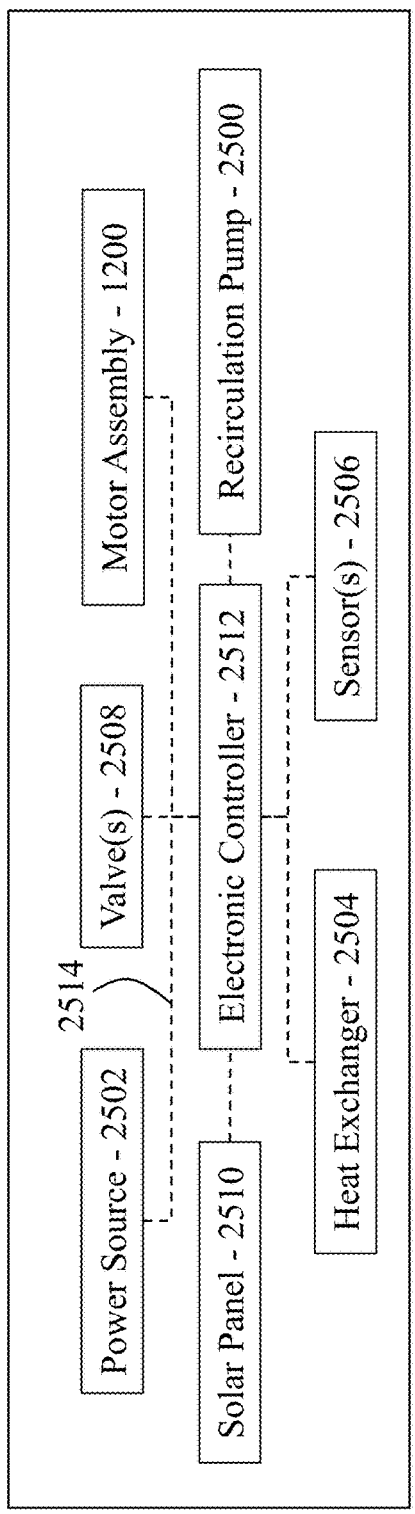
FIG. 25 is a schematic diagram depicting components electrically coupled together in a mobile bathroom assembly in accordance with one embodiment of the present invention.
Figure 26:
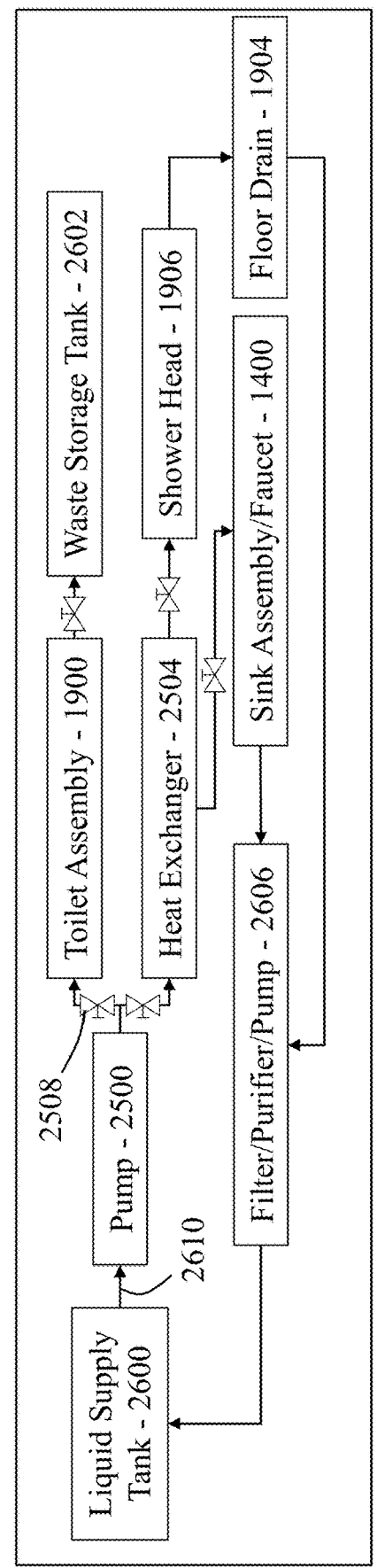
FIG. 26 is a schematic diagram depicting components fluidly coupled together in a mobile bathroom assembly in accordance with one embodiment of the present invention.

The toilet assembly 1900, faucet 1402, and other liquid-receiving components utilized in the assembly may be fluidly coupled to one or more liquid supply tank(s) 2600 and a circulation pump 2500. In some embodiments, the toilet assembly 1900 does not utilize pressurized liquid, e.g., water, but rather accumulates users' waste and liquid for dumping. The toilet assembly 1900 may also be operable to be moved from the lower shell 200 to another structure, e.g., a ground surface. FIG. 26 beneficially depicts an exemplary schematic of components fluidly coupled together over a liquid-transportation network using, for example, a conduit assembly (depicted with arrows, e.g., arrow 2610). The direction of the arrows 2610 may depict the flow direction within the liquid-transportation network, wherein various electronically controlled and/or mechanically controlled valves 2508 are operably configured to selectively limit or restrict the flow of liquid within the liquid-transportation network as desired by the user and/or when certain conditions are met. Said another way, and also with reference to FIG. 25, the valves 2508 (and other electrical components utilized in the assembly 100) may be selectively controlled by and/or are communicatively coupled to an electronic controller 2512 that is operably configured to send and/or receive signals from the electronic components utilized in the assembly 100. Wireless and wired connections between the electrical components are depicted in FIG. 25 with dashed lines, e.g., communication line 2514. As such, the toilet assembly 1900, faucet 1402, and/or other electrical-mechanical components may be electrically coupled to a power source 2502. For example, the circulation pump 2500 may be operably configured to induce a flow of liquid from the liquid supply tank 2600 to the toilet assembly 1900 and the faucet 1402 upon detecting the user activating the same, e.g., utilizing a switch and/or one or more sensor(s) 2506.

Looking specifically at FIG. 2, FIG. 4, FIG. 19, and FIGS. 25-26, the upper shell 104 has a ceiling wall 212 and defines an internal assembly height 404 spanning from the ceiling wall 212 to the bottom wall 206. The upper shell 104 also includes a sidewall 214 slidably coupled to the sidewall 202 of the lower shell 200 in a retained configuration and also surrounds the ceiling wall 212 to enclose an upper shell cavity 402 that is configured to overlap the lower shell opening 210. Like the sidewall 202, the upper shell 104 sidewall 214 may be free of any openings. In one embodiment, openings are required to be made in the sidewall 202 of the lower shell 200 for receiving one or more fasteners configured to retain components thereon, wherein just the sidewall 214 of the upper shell 104 (that is primarily exposed to the elements when stored and/or in transport) is completely free of any apertures thereon.

The upper shell 104 also includes a lower end 900 opposing the ceiling wall 212 and may define an upper shell opening 902 with the sidewall 202 of the lower shell 200 disposed therein. The upper shell 104 also includes an upper sidewall door 106 hingedly coupled thereto and that is disposed in an overlapping configuration with the lower sidewall door 204, thereby enabling both of the sidewall doors 106, 204 to be opened together to expose the cavities 400, 402. The upper shell 104 may also include a shower head 1906 coupled thereto, disposed within the upper shell cavity 402, and fluidly coupled to the liquid supply tank 2600, wherein the circulation pump 2500 is operably configured to induce a flow of liquid from the liquid supply tank 2600 to the shower head 1906 for use by the user. As such, the circulation pump 2500 may be operable to pump approximately 0.5-1 gallons of liquid from the liquid supply tank 2600. As appreciated by those of skill in the art, the shower head 1906 may include an emission aperture 1908 operably configured to cause liquid to emit therefrom. The shower head 1906 is beneficially oriented and configured such that the emitted liquid is oriented in a direction toward the floor drain 1904.

Figure 12:
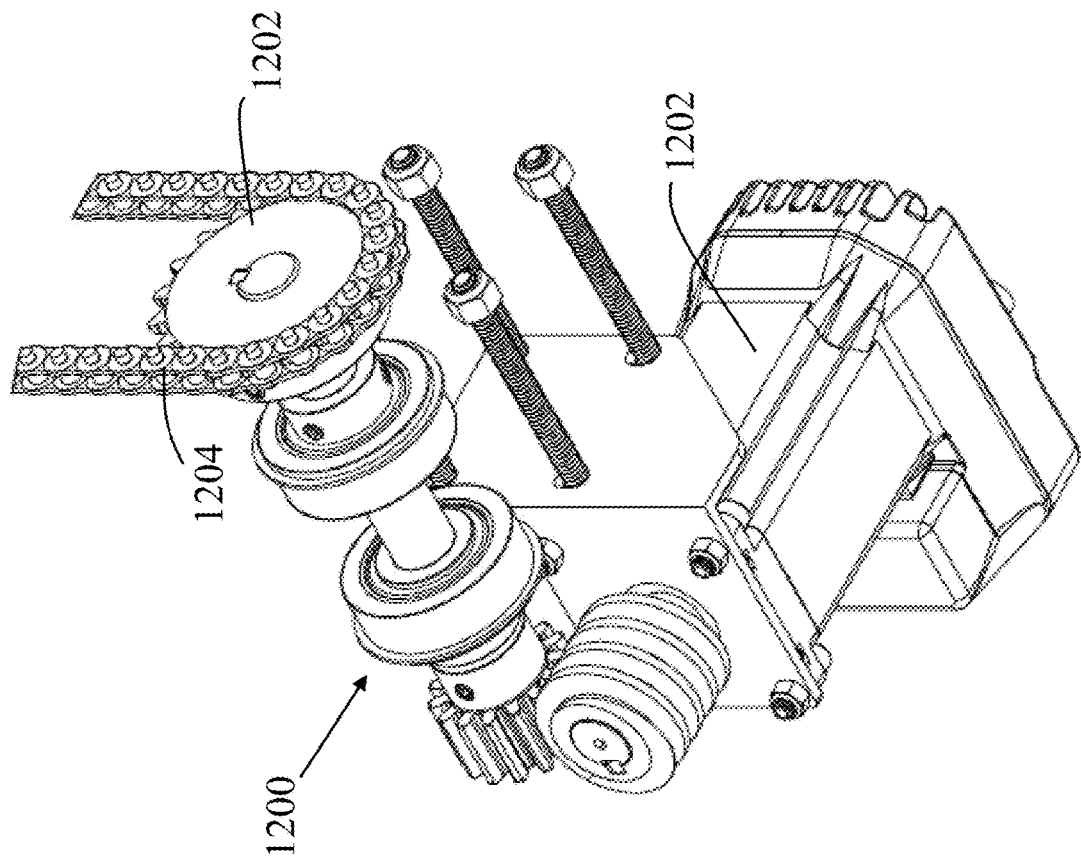
FIG. 12 is a perspective view of a motor assembly of the mobile bathroom assembly in accordance with one embodiment of the present invention.
Figure 15:
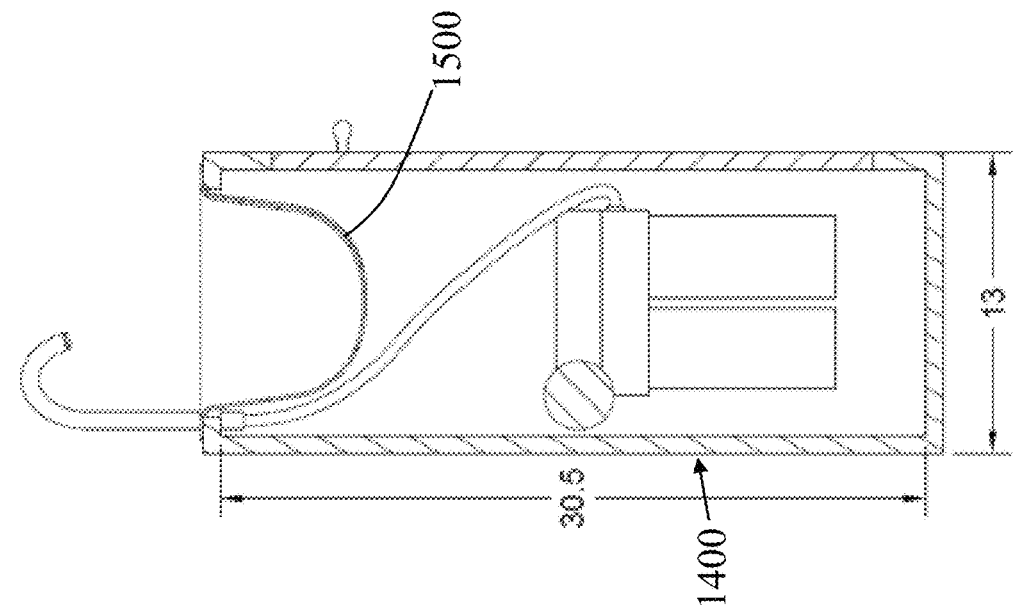
FIG. 15 is a cross-sectional view of the sink assembly along section line 15-15 in FIG. 14.
Figure 14:
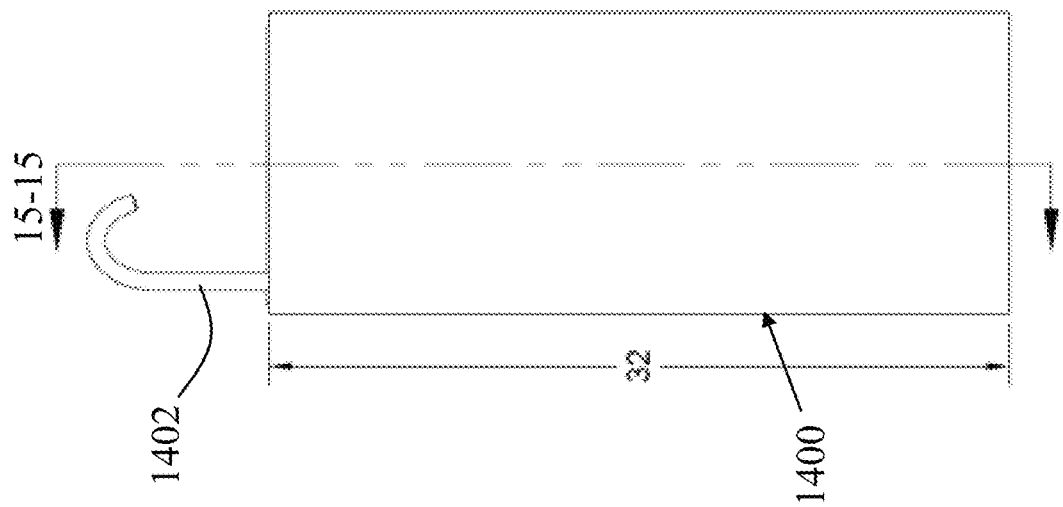
FIG. 14 is an elevational side view of a sink assembly utilized in the mobile bathroom assembly in accordance with one embodiment of the present invention.
Figure 16:
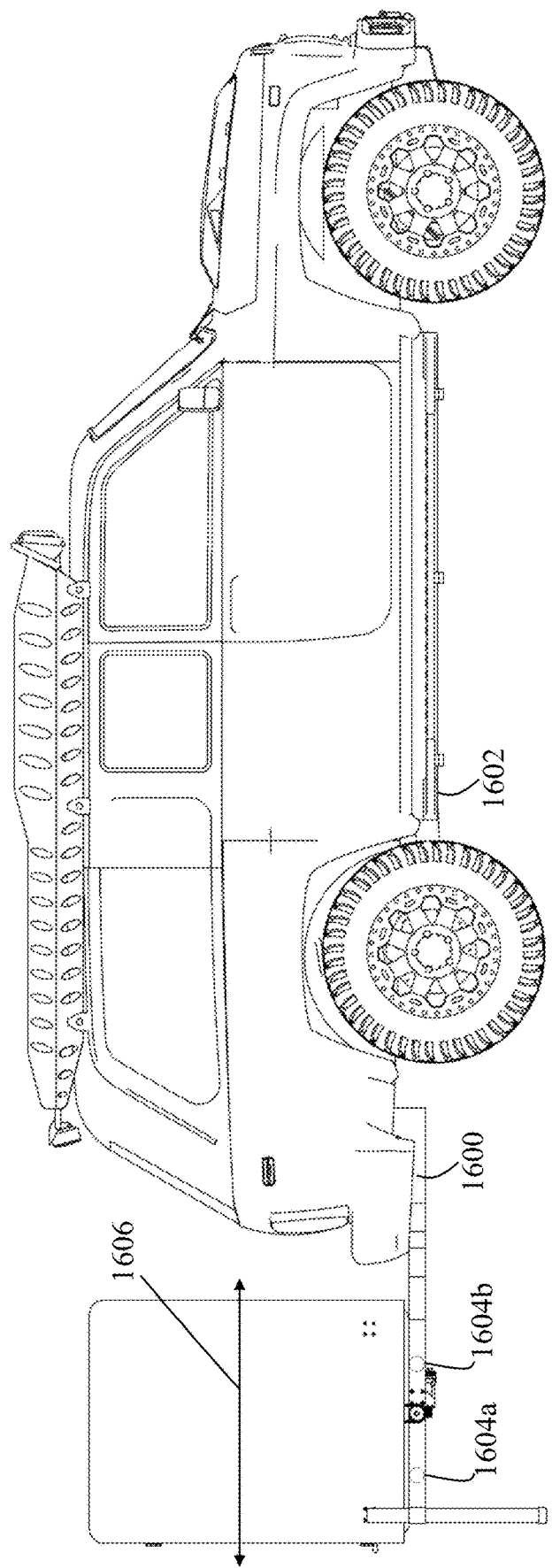
FIG. 16 is an elevational side view of a mobile bathroom assembly in a contracted transportation configuration and coupled to a vehicle in accordance with one embodiment of the present invention.
Figure 17:
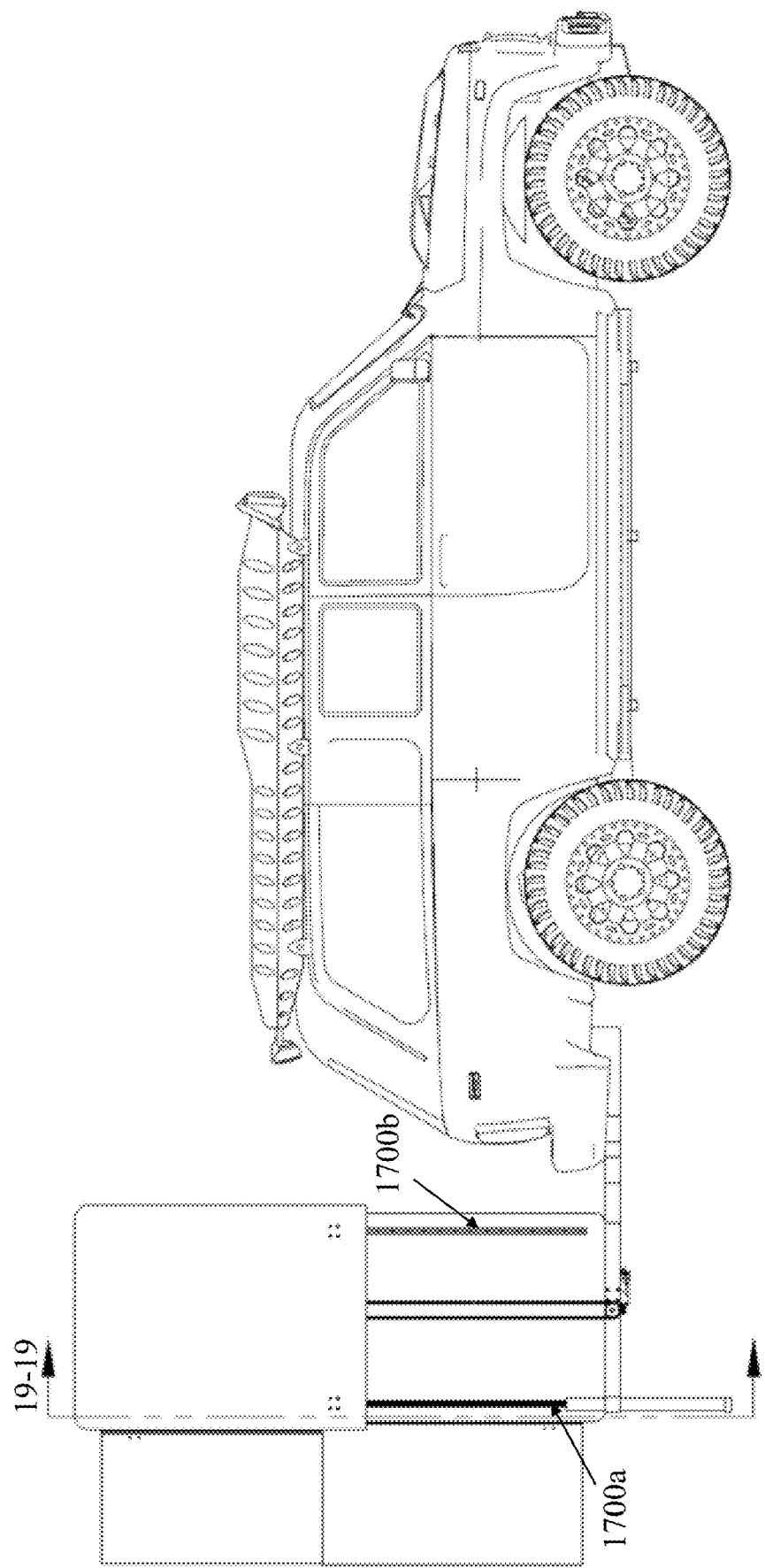
FIG. 17 is an elevational side view of a mobile bathroom assembly in a utilization configuration and coupled to a vehicle in accordance with one embodiment of the present invention.

As best seen in FIG. 2, FIG. 4, and FIGS. 12-13, a motor assembly 1200 may be coupled to the lower shell 200, that is electrically coupled to the power source 2502, and is operably configured to selectively cause the upper shell 104 to translate linearly along an upper shell translation path (represented with arrow 216) with respect to the upper shell 104 to modulate the internal assembly height 404. Specifically, FIG. 12 depicts a worm and wheel gear configuration that is operably configured to drive a plurality of sprockets operably coupled to a chain. The motor assembly 1200 and gear train assembly should be sufficient to raise and lower the weight of the upper shell 104 (and any components coupled thereto, e.g., the shower head 1906, overhead lights for example, LEDs electrically coupled to the power source 2502. In other embodiments, the motor assembly 1200 may include or consist of one or more motor/pump-drive actuator(s) configured to raise/lower the upper shell 104 with respect to the lower shell 200.

Also referring to FIG. 2, FIGS. 12-13, FIGS. 19-20, FIG. 23, and FIG. 25, to effectuate an effective, safe, and efficient translation of the upper shell 104, a first tongue-and-groove configuration track assembly 1912, 2300 may be coupled to the sidewalls 202, 2014 of the lower and upper shells 200, 104 on a left side 1908 of the lower shell 200 and a second tongue-and-groove configuration track assembly 1700*a-b* may be coupled to the sidewalls 202, 2014 of the lower and upper shells 200, 104 on a right side 1910 of the lower shell 200 opposing the left side 1908 of the lower shell 200. Said another way, there are one or more tracks (preferably of a tongue-and-groove configuration) coupled to both the inner surface of the sidewall 214 and the outer surface of the sidewall 202 and an opposing mating track or guide operably configured to matingly couple thereto and keep the upper shell 104 laterally restrained thereon.

In one embodiment, the motor assembly 1200 includes a first motor operably coupled to a driving sprocket 1202 directly coupled to a chain 1204 directly coupled to an idler sprocket 1300 coupled to the left side 1908 of the lower shell 200 and directly coupled to a guiding sprocket 1302 coupled to the sidewall 214 of the upper shell 104 with at least one guiding sprocket fastener 1304. The guiding sprocket 1302 may include a circular teethed structure as shown in the figures or may include an elongated rack gear or sprocket configured to engage with the chain 1204. Similarly, a second motor may be operably coupled to a driving sprocket 1202 directly coupled to a chain 1204 directly coupled to an idler sprocket 1300 coupled to the right side 1910 of the lower shell 200 and directly coupled to a guiding sprocket 1302 coupled to the sidewall 214 of the upper shell 104 with at least one guiding sprocket fastener 1304. In one embodiment, the idler sprockets coupled to the left and right sides 1908, 1910 of the lower shell 200 are disposed proximal to (as defined above) the upper end 208 of the lower shell 200.

In some embodiment, the support frame member assembly 102 includes a plurality of tubular rigid support frame members 1104a-n that includes a left rigid support frame member 1104a, a middle rigid support frame member 1104b, and a right rigid support frame member 1104c each spatially offset from one another and coupled together with a proximal rigid support frame member 1104d and a distal rigid support frame member 1104n, wherein at least two of the left, middle, right, proximal, and distal rigid support frame members 1104a-n having a plurality of support surfaces defining a support plane 1110 parallel with a hitch plane 1112 defined by the upper surface 1114 of the rigid hitch frame member 1100.

Figure 18:
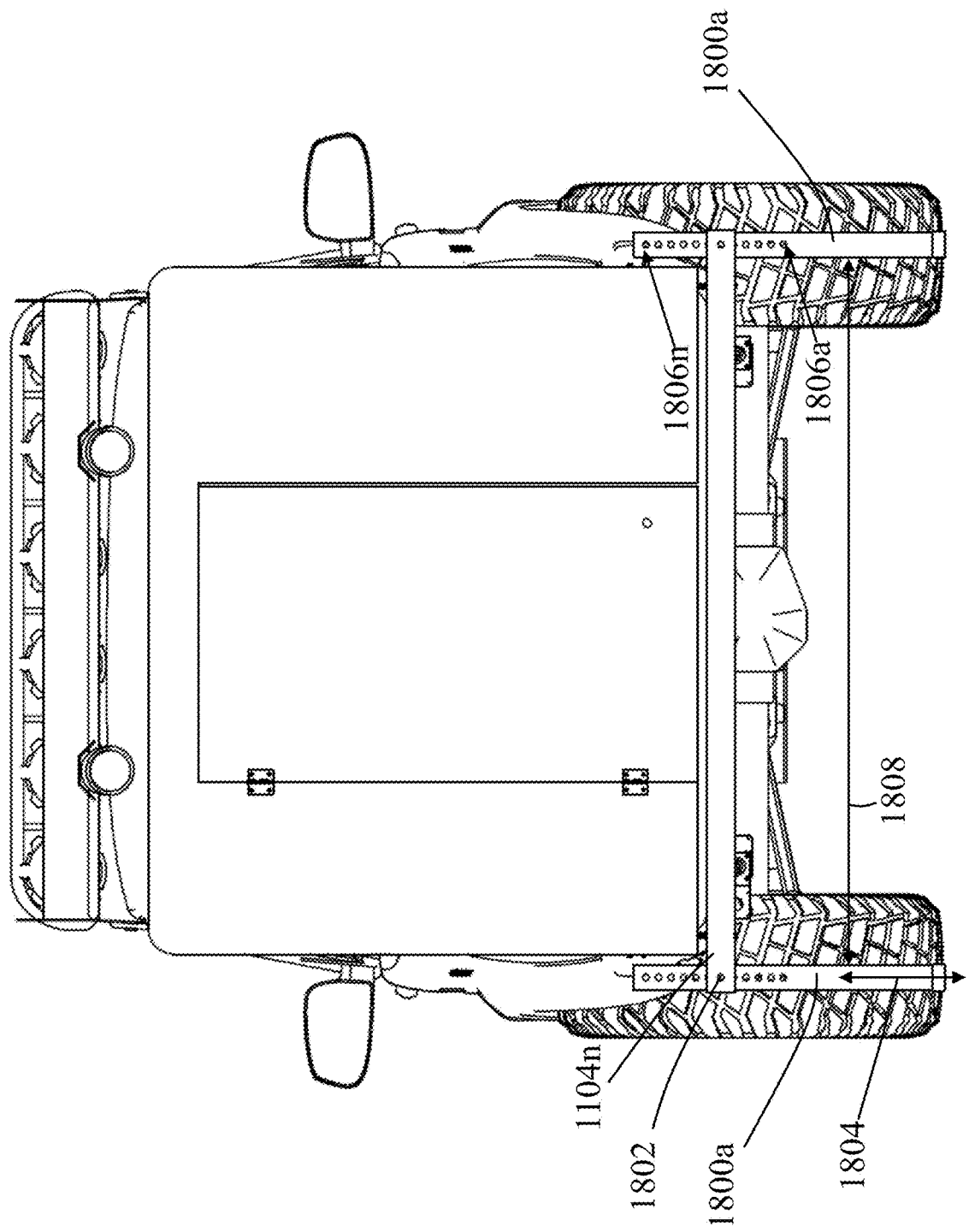
FIG. 18 is an elevational front view of a mobile bathroom assembly in a contracted transportation configuration and coupled to a vehicle in accordance with one embodiment of the present invention.
Figure 19A:
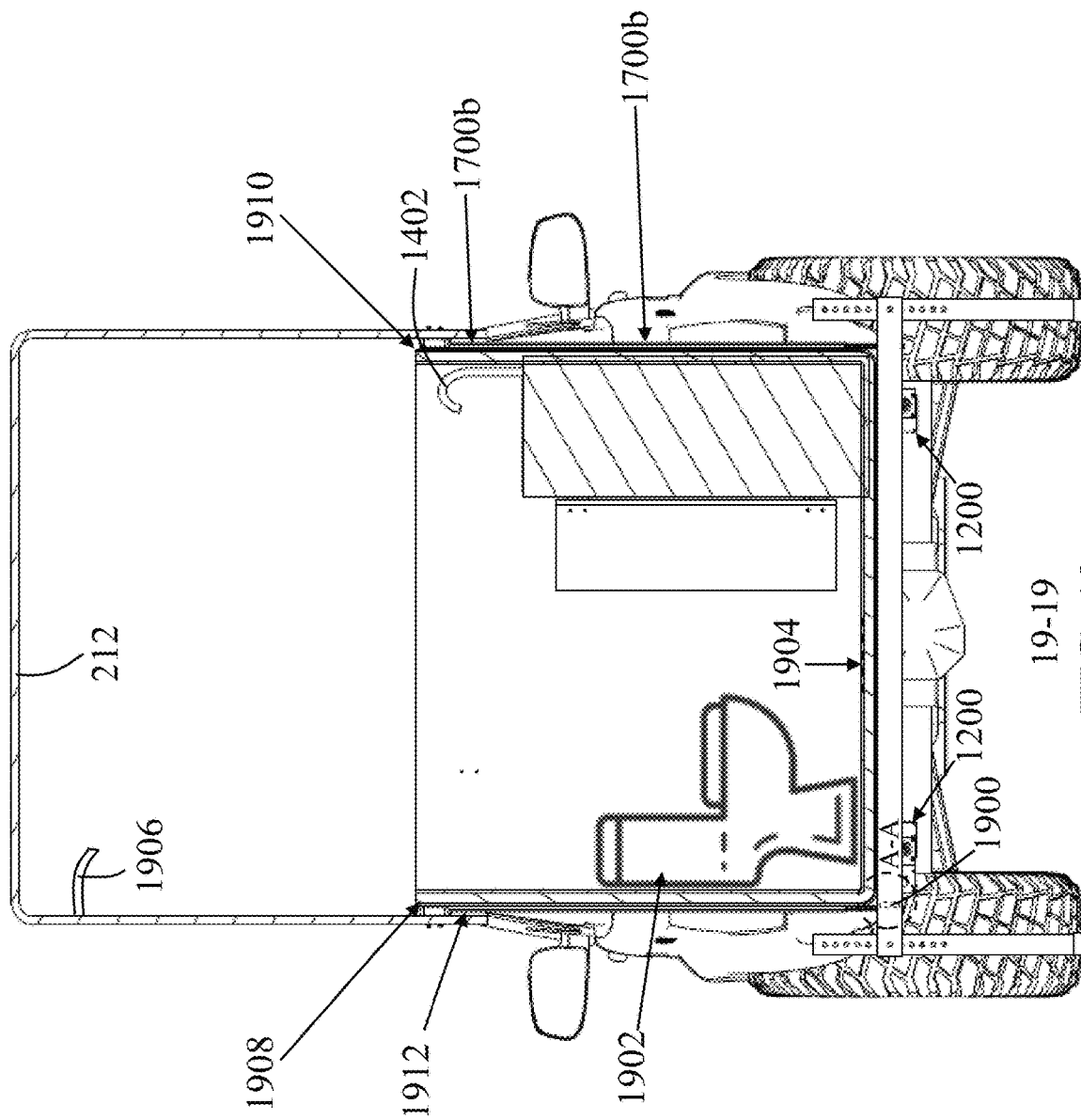
FIG. 19a is a cross-sectional view of the mobile bathroom assembly in FIG. 17.
Figure 19B:
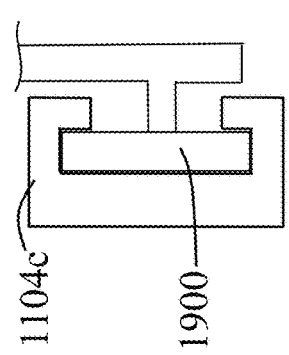
Figure 21:
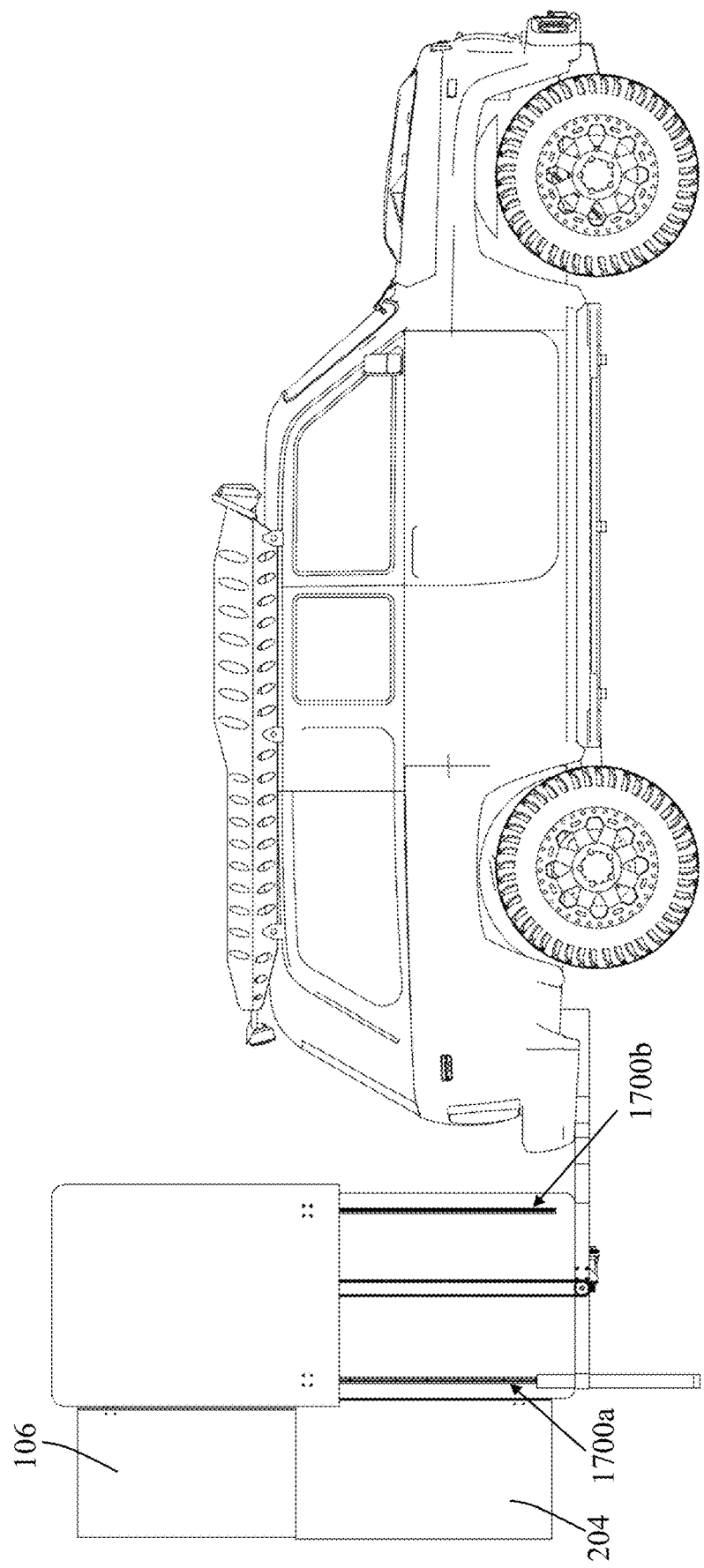
FIG. 21 is an elevational side view of a mobile bathroom assembly in a utilization configuration and coupled to a vehicle in accordance with one embodiment of the present invention.
Figure 22:
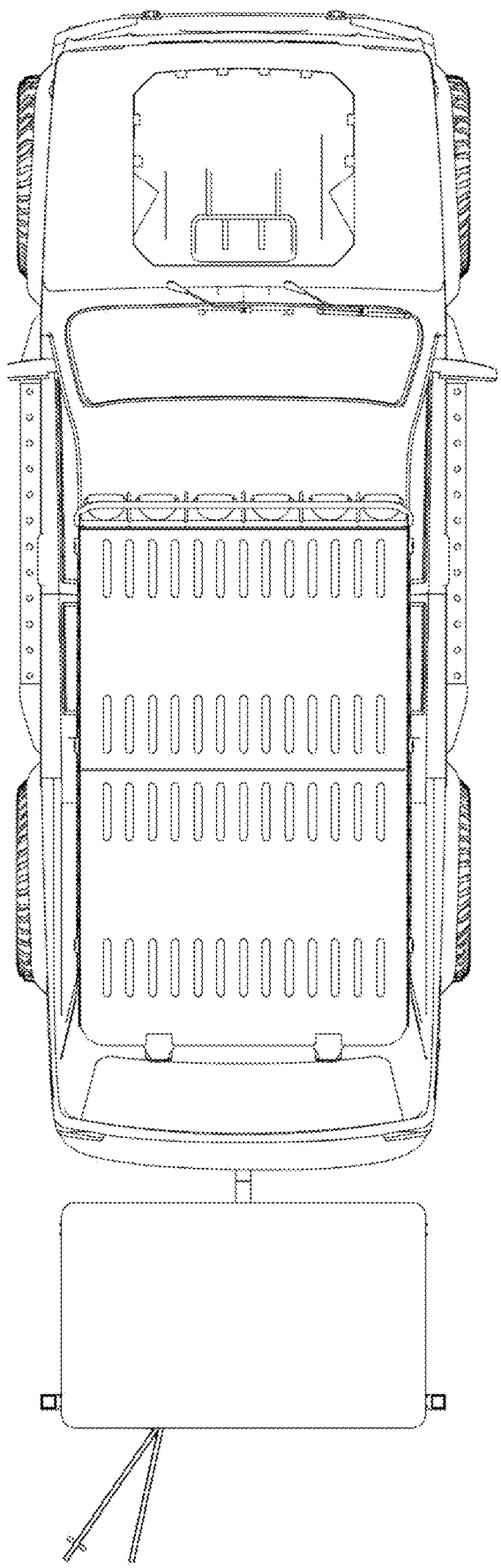
FIG. 22 is a top plan view of the mobile bathroom assembly in FIG. 21.
Figure 23:
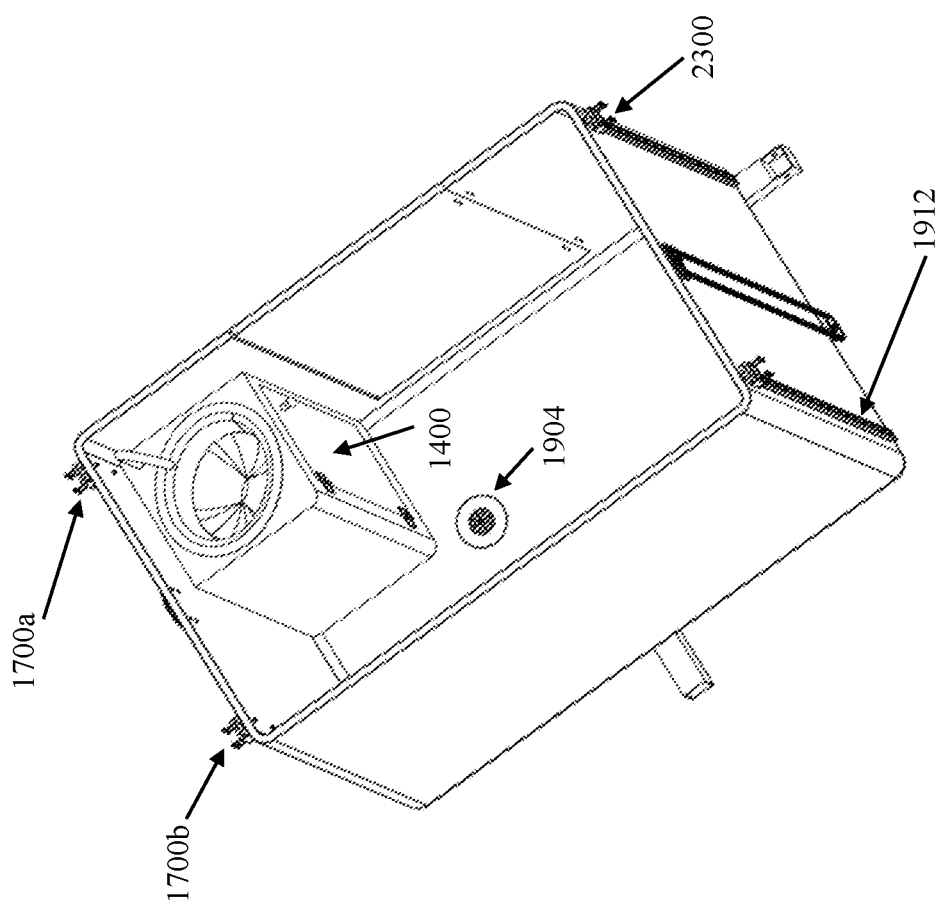
FIG. 23 is a perspective view of a lower shell of the mobile bathroom assembly in accordance with one embodiment of the present invention.
Figure 24:
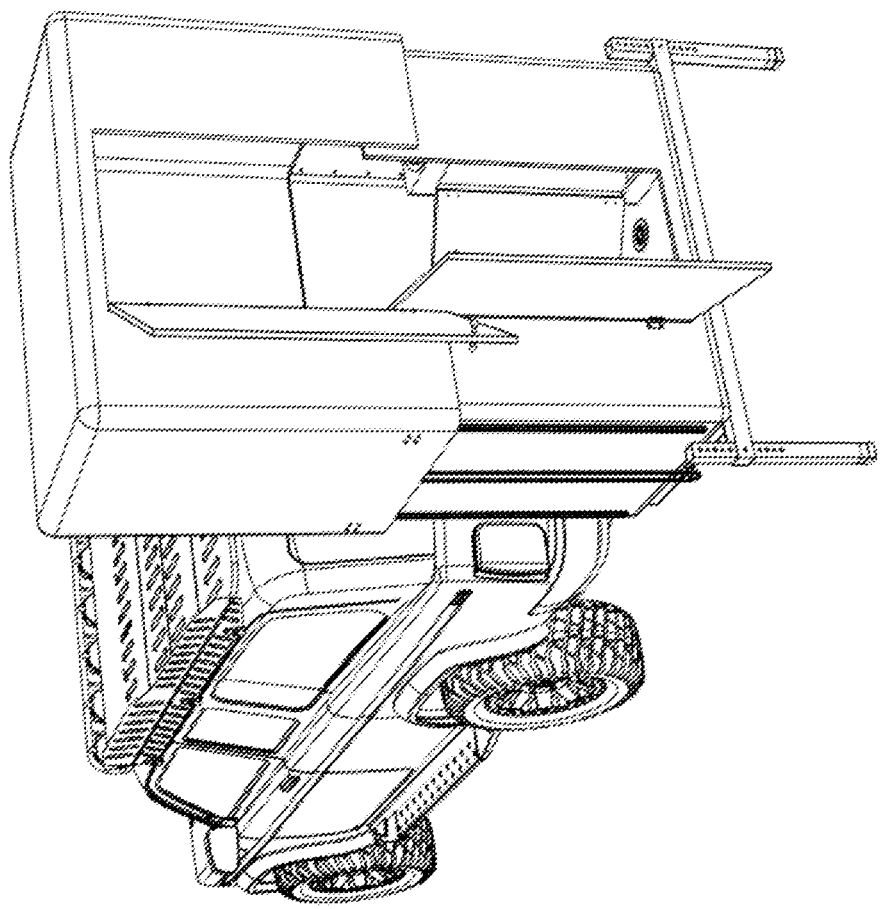
FIG. 24 is a perspective view of a mobile bathroom assembly in a utilization configuration and coupled to a vehicle in accordance with one embodiment of the present invention.

As best seen in FIG. 11 and FIGS. 18-19, the distal rigid support frame member 1104n on the support frame member assembly 102 beneficially defines one or more outrigger aperture(s) 1118a-n thereon. Furthermore, one or more outrigger member(s) 1800a-b are sized and shaped to be received within the outrigger aperture(s) 1118a-n, wherein the outrigger members 1800a-b are operably configured to slidably lockably couple to the distal rigid support frame member 1104n with one or more outrigger locking fastener(s) 1802 and operably configured to translate in a outrigger translation path (represented with arrow 1804) perpendicular to a support plane 1110 defined by the a plurality of support surfaces on the support frame member assembly 102. In one embodiment, the at least one outrigger member 1800a-b is operably configured to slidably lockably couple to the distal rigid support frame member 1104n with an outrigger locking fastener 1802 that is operably configured to be inserted through a plurality of outrigger position apertures 1806a-n.

The outrigger member(s) 1800a-b, like the support frame member 1104a-n, are of a rigid material sufficient to support the needed weight thereon. In one embodiment, a first outrigger aperture 1118a and a second outrigger aperture 1118n are both defined on the distal rigid support frame member 1104n and define an outrigger spacing length 1808 separating the first outrigger member 1800a and the second outrigger member 1800a that are sized and shaped to be received within the first and second outrigger apertures 1118a-n, respectively. Additionally, an outer shell width 1000 is defined by the upper shell 104 that separates two outer opposing surface sides of the upper shell 104 and flank the upper sidewall door 106a, wherein the outer shell width 1000 is less than the outrigger spacing length 1808. This advantageous spacing enables the upper shell 104 to potentially move back-and-forth on the support frame member assembly 102 without contacting the outrigger member(s) 1800a-b.

In one embodiment, the motor assembly 1200 is operably configured to selectively cause the upper shell 104 to translate linearly along the upper shell translation path 216 with respect to the lower shell 200 to generate a contracted transportation configuration (shown best in FIGS. 1-2, FIG. 16, and FIG. 18) and an expanded utilization configuration (shown best in FIGS. 3-4, FIG. 17, FIGS. 19-21, and FIG. 24). The contracted transportation configuration includes the ceiling wall 212 disposed proximal to the upper end 208 of the lower shell 200 and the utilization configuration includes the internal assembly height 404 at least 1.5 times greater than a lower shell height 600 separating the inner surface 602 of the bottom wall 206 of the lower shell 200. The utilization configuration may also include the assembly utilizing one or more adjustable stabilizer jacks to stabilize the back of the assembly and a removable short jack in the front of the assembly could be used when the assembly is disconnected from the vehicle, making the assembly a functional self-contained bathroom.

Exemplary, preferred, and approximate dimensions of the internal assembly height 404 and other components are depicted in the figures in inches, but other dimensions may be utilized without deviating from the spirit and scope of the present invention.

The contracted transportation configuration and the utilization configuration may both include the lower sidewall door 204 and the upper sidewall door 106 operably configured to open to define an assembly access opening 2000 exposing an ambient environment 2002 to the lower shell opening 210 and upper shell cavity 402. The assembly access opening 2000 preferably spans at least 90% of the internal assembly height 404 to provide adequate space the user to utilize the assembly 100.

With reference to FIGS. 19-20 and FIGS. 23-26, the assembly 100 may also include a heat exchanger 2504 electrically coupled to a power source 2502 and fluidly coupled to a liquid supply tank 2600 downstream therefrom and fluidly coupled to the shower head 1906 and the faucet 1402 upstream therefrom, wherein the heat exchanger 2504 is operably configured to selectively transfer heat to a liquid housed within the liquid supply tank 2600. Said differently, one embodiment of the present invention includes the pump 2500 pumping liquid from the liquid supply tank 2600 upon the user activating one or more switches/sensors 2506 on the toilet assembly 1900, shower head 1906, and/or sink assembly/faucet 1400. The heat exchanger 2504 may also be driven by gas, e.g., propane, or through solar energy. The valves 2508 may be manually or electronically controlled to modulate the flow of liquid and/or direct the flow of liquid through the appropriate conduit and to the appropriate structure. The liquid dispensed from the toilet assembly 1900 may be selectively transported to a waste storage tank 2602 for emptying by the user and/or may be emitted directly to a ground surface from the toilet assembly 1900 and/or the waste storage tank 2602. The liquid dispensed from the shower head 1906 may be directed to a floor drain 1904 that may be then pumped or gravity-fed to a filtering/purifying unit/pump 2606 operably configured to disinfect/sanitize (using a sediment, cartridge, filter, UV light, etc.) the liquid for re-use in the system. Similarly, the liquid dispensed from the sink assembly/faucet 1400 may be directed to a filtering/purifying unit/pump 2606. The liquid may then be delivered downstream of the filtering/purifying unit/pump 2606 for storage in the liquid supply tank 2600.

The power source 2502 in the assembly may be a 12-24V battery that may be selectively charged with an internal power source, e.g., the vehicle's power source, and/or an external power source, e.g., A/C outlet, or charged with a solar panel 2510 coupled to the assembly 100, e.g., on the ceiling wall 212. The ceiling wall 212 may also include a ceiling fan electrically coupled to the power source 2502. The power source 2502 may also be electrically coupled to a license plate bracket coupled to the upper shell 104.

Although a specific order of executing process steps has been described herein, the order of executing the steps may be changed relative to the order shown in certain embodiments. Also, two or more steps shown or described as occurring in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A mobile bathroom assembly comprising:
   a support frame member assembly having a rigid hitch frame member operably configured to be insertable lockably retained, with a hitch fastener, to a trailer hitch coupled to a vehicle and at least one rigid support frame member coupled to the rigid hitch frame member;
   a lower shell directly coupled to the at least one rigid support frame member having a bottom wall, and having a sidewall surrounding the bottom wall, enclosing a lower shell cavity, with an upper end opposing the bottom wall and defining a lower shell opening, and with a lower sidewall door hingedly coupled thereto, the bottom wall having a toilet assembly coupled thereto, a sink assembly coupled thereto and with a faucet and sink bowl, and a floor drain directly coupled thereto, the faucet fluidly coupled to a liquid supply tank and a circulation pump electrically coupled to a power source and operably configured to induce a flow of liquid from the liquid supply tank to the faucet;
   an upper shell having a ceiling wall, defining an internal assembly height spanning from the ceiling wall to the bottom wall and having a sidewall slidably coupled to the sidewall of the lower shell in a retained configuration, surrounding the ceiling wall, enclosing an upper shell cavity overlapping the lower shell opening, with a lower end opposing the ceiling wall and defining an upper shell opening with the sidewall of the lower shell disposed therein, and with an upper sidewall door hingedly coupled thereto and disposed in an overlapping configuration with the lower sidewall door, the upper shell having a shower head coupled thereto, disposed within the upper shell cavity, and fluidly coupled to the liquid supply tank and the circulation pump operably configured to induce a flow of liquid from the liquid supply tank to the shower head; and
   a motor assembly coupled to the lower shell, electrically coupled to the power source, and operably configured to selectively cause the upper shell to translate linearly along an upper shell translation path with respect to the upper shell to modulate the internal assembly height, the motor assembly including:
   a first motor operably coupled to a driving sprocket directly coupled to a chain directly coupled to an idler sprocket coupled to the left side of the lower shell and directly coupled to a guiding sprocket coupled to the sidewall of the upper shell with at least one guiding sprocket fastener; and
   a second motor operably coupled to a driving sprocket directly coupled to a chain directly coupled to an idler sprocket coupled to the right side of the lower shell and directly coupled to a guiding sprocket coupled to the sidewall of the upper shell with at least one guiding sprocket fastener.

2. The mobile bathroom assembly according to claim 1, further comprising:
   a heat exchanger electrically coupled to a power source and fluidly coupled to the liquid supply tank upstream therefrom and fluidly coupled to the shower head and the faucet downstream therefrom, the heat exchanger operably configured to selectively transfer heat to a liquid housed within the liquid supply tank.

3. The mobile bathroom assembly according to claim 1, wherein:
   the toilet assembly is fluidly coupled to the liquid supply tank and the circulation pump, the circulation pump operably configured to induce a flow of liquid from the liquid supply tank to the toilet assembly.

4. The mobile bathroom assembly according to claim 1, further comprising:
   a first tongue-and-groove configuration track assembly coupled to the sidewalls of the lower and upper shells on a left side of the lower shell and a second tongue-and-groove configuration track assembly coupled to the sidewalls of the lower and upper shells on a right side of the lower shell opposing the left side of the lower shell.

5. The mobile bathroom assembly according to claim 1, wherein:
   the motor assembly is operably configured to selectively cause the upper shell to translate linearly along the upper shell translation path with respect to the lower shell to generate a contracted transportation configuration and an expanded utilization configuration, the contracted transportation configuration including the ceiling wall disposed proximal to the upper end of the lower shell and the utilization configuration including the internal assembly height at least 1.5 times greater than the internal assembly height when in the contracted configuration.

6. The mobile bathroom assembly according to claim 5, wherein:
   the contracted transportation configuration and the utilization configuration both include the lower sidewall door and the upper sidewall door operably configured to open to define an assembly access opening exposing an ambient environment to the lower shell opening and upper shell cavity, the assembly access opening spanning at least 90% of the internal assembly height.

7. The mobile bathroom assembly according to claim 1, wherein the support frame member assembly further comprises:
   a plurality of tubular rigid support frame members including a left rigid support frame member, a middle rigid support frame member, and a right rigid support frame member each spatially offset from one another and coupled together with a proximal rigid support frame member and a distal rigid support frame member, at least two of the left, middle, right, proximal, and distal rigid support frame members having a plurality of support surfaces defining a support plane parallel with a hitch plane defined by the upper surface of the rigid hitch frame member.

8. The mobile bathroom assembly according to claim 7, further comprising:
   a plurality of wheels operably coupled to at least two of the left, middle, right, proximal, and distal rigid support frame members and coupled to the lower shell, the lower shell operably configured to translate linearly along a shell translation path and along the support plane.

9. The mobile bathroom assembly according to claim 8, further comprising:
the lower shell is operably configured to be placed in a linearly locked positional configuration along the shell translation path with a plurality of locking fasteners.

10. The mobile bathroom assembly according to claim 1, further comprising:
a distal rigid support frame member on the support frame member assembly and defining at least one outrigger aperture defined thereon; and
at least one outrigger member sized and shaped to be received within the at least one outrigger aperture, the least one outrigger member operably configured to slidably lockably couple to the distal rigid support frame member with an outrigger locking fastener and operably configured to translate in an outrigger translation path perpendicular to a support plane defined by a plurality of support surfaces on the support frame member assembly.

11. The mobile bathroom assembly according to claim 10, wherein the support frame member assembly further comprises:
a plurality of tubular rigid support frame members including a left rigid support frame member, a middle rigid support frame member, and a right rigid support frame member each spatially offset from one another and coupled together with a proximal rigid support frame member and the distal rigid support frame member, at least two of the left, middle, right, proximal, and distal rigid support frame members having the plurality of support surfaces defining the support plane parallel with a hitch plane defined by the upper surface of the rigid hitch frame member.

12. The mobile bathroom assembly according to claim 11, further comprising:
a first outrigger aperture and a second outrigger aperture both defined on the distal rigid support frame member and defining an outrigger spacing length separating a first outrigger member and a second outrigger member sized and shaped to be received within the first and second outrigger apertures, respectively; and
an outer shell width separating two outer opposing surface sides of the upper shell and flanking the upper sidewall door, the outer shell width less than the outrigger spacing length.

13. In combination with a vehicle having a trailer hitch with a receiver tube, the improvement comprising:
a mobile bathroom assembly having:
a support frame member assembly having a rigid hitch frame member disposed within the receiver tube of the trailer hitch in a lockably retained configuration with a hitch fastener, the support frame member assembly with a plurality of rigid support frame members spatially offset from one another, with at least one of the rigid support frame members coupled to the rigid hitch frame member, and each having a support surface collectively defining a support plane parallel with a hitch plane defined by the upper surface of the rigid hitch frame member;
a lower shell directly coupled to the at least one rigid support frame member, having a bottom wall, and having a sidewall surrounding the bottom wall, enclosing a lower shell cavity, with an upper end opposing the bottom wall and defining a lower shell opening, and with a lower sidewall door hingedly coupled thereto, the bottom wall having a toilet assembly coupled thereto, the lower shell operably configured to translate linearly along a shell translation path in a direction along the support plane and operably configured to have a linearly locked positional configuration along the shell translation path with at least one locking fastener;
an upper shell having a ceiling wall, defining an internal assembly height spanning from the ceiling wall to the bottom wall and having a sidewall slidably coupled to the sidewall of the lower shell in a retained configuration, surrounding the ceiling wall, enclosing an upper shell cavity overlapping the lower shell opening, with a lower end opposing the ceiling wall and defining an upper shell opening with the sidewall of the lower shell disposed therein, and with an upper sidewall door hingedly coupled thereto and disposed in an overlapping configuration with the lower sidewall door; and
a motor assembly coupled to the lower shell, electrically coupled to the power source, and operably configured to selectively cause the upper shell to translate linearly along an upper shell translation path with respect to the upper shell to modulate the internal assembly height.

14. The improvement according to claim 13, further comprising:
a first tongue-and-groove configuration track assembly coupled to the sidewalls of the lower and upper shells on a left side of the lower shell and a second tongue-and-groove configuration track assembly coupled to the sidewalls of the lower and upper shells on a right side of the lower shell opposing the left side of the lower shell.

15. The improvement according to claim 13, wherein the motor assembly further comprises:
a first motor operably coupled to a driving sprocket directly coupled to a chain directly coupled to an idler sprocket coupled to the left side of the lower shell and directly coupled to a guiding sprocket coupled to the sidewall of the upper shell 104 with at least one guiding sprocket fastener; and
a second motor operably coupled to a driving sprocket directly coupled to a chain directly coupled to an idler sprocket coupled to the right side of the lower shell and directly coupled to a guiding sprocket coupled to the sidewall of the upper shell with at least one guiding sprocket fastener.

16. The improvement according to claim 13, further comprising:
a sink assembly coupled to the bottom wall and with a faucet and sink bowl; and
a floor drains directly coupled to the bottom wall, the faucet and toilet assembly fluidly coupled to the liquid supply tank and a circulation pump electrically coupled to a power source and operably configured to induce a flow of liquid from the liquid supply tank to the faucet and the toilet assembly.

17. The improvement according to claim 16, further comprising:
a shower head coupled to the upper shell, disposed within the upper shell cavity, and fluidly coupled to the liquid supply tank and the circulation pump that is operably configured to induce a flow of liquid from the liquid supply tank to the shower head.

18. A mobile bathroom assembly comprising:

a support frame member assembly having a rigid hitch frame member operably configured to be insertable lockably retained, with a hitch fastener, to a trailer hitch coupled to a vehicle and at least one rigid support frame member coupled to the rigid hitch frame member;

a lower shell directly coupled to the at least one rigid support frame member having a bottom wall, and having a sidewall surrounding the bottom wall, enclosing a lower shell cavity, with an upper end opposing the bottom wall and defining a lower shell opening, and with a lower sidewall door hingedly coupled thereto, the bottom wall having a toilet assembly coupled thereto, a sink assembly coupled thereto and with a faucet and sink bowl, and a floor drain directly coupled thereto, the faucet fluidly coupled to a liquid supply tank and a circulation pump electrically coupled to a power source and operably configured to induce a flow of liquid from the liquid supply tank to the faucet;

an upper shell having a ceiling wall, defining an internal assembly height spanning from the ceiling wall to the bottom wall and having a sidewall slidably coupled to the sidewall of the lower shell in a retained configuration, surrounding the ceiling wall, enclosing an upper shell cavity overlapping the lower shell opening, with a lower end opposing the ceiling wall and defining an upper shell opening with the sidewall of the lower shell disposed therein, and with an upper sidewall door hingedly coupled thereto and disposed in an overlapping configuration with the lower sidewall door, the upper shell having a shower head coupled thereto, disposed within the upper shell cavity, and fluidly coupled to the liquid supply tank and the circulation pump operably configured to induce a flow of liquid from the liquid supply tank to the shower head;

a first tongue-and-groove configuration track assembly coupled to the sidewalls of the lower and upper shells on a left side of the lower shell and a second tongue-and-groove configuration track assembly coupled to the sidewalls of the lower and upper shells on a right side of the lower shell opposing the left side of the lower shell; and a motor assembly coupled to the lower shell, electrically coupled to the power source, and operably configured to selectively cause the upper shell to translate linearly along an upper shell translation path with respect to the upper shell and on the first and second first tongue-and-groove configuration track assemblies to modulate the internal assembly height, the motor assembly including:

a first motor operably coupled to a driving sprocket directly coupled to a chain directly coupled to an idler sprocket coupled to the left side of the lower shell and directly coupled to a guiding sprocket coupled to the sidewall of the upper shell with at least one guiding sprocket fastener; and a second motor operably coupled to a driving sprocket directly coupled to a chain directly coupled to an idler sprocket coupled to the right side of the lower shell and directly coupled to a guiding sprocket coupled to the sidewall of the upper shell with at least one guiding sprocket fastener.

* * * * *